(12) United States Patent
Green

(10) Patent No.: US 7,275,096 B2
(45) Date of Patent: Sep. 25, 2007

(54) COMPUTERIZED SYSTEM AND METHOD FOR WEB ENABLING AND/OR WEB MANAGEMENT OF EMBEDDED APPLICATIONS

(75) Inventor: Doron Green, Tel-Aviv (IL)

(73) Assignee: Telelogic North America Inc., Mt. Arlington, NJ (US)

( * ) Notice: Subject to any disclaimer, the term of this patent is extended or adjusted under 35 U.S.C. 154(b) by 855 days.

(21) Appl. No.: 10/247,815

(22) Filed: Sep. 20, 2002

(65) Prior Publication Data

US 2003/0101255 A1   May 29, 2003

Related U.S. Application Data

(60) Provisional application No. 60/323,322, filed on Sep. 20, 2001.

(51) Int. Cl.
 G06F 15/173   (2006.01)
 G06F 9/44     (2006.01)
(52) U.S. Cl. .................. 709/223; 709/224; 717/104; 717/105
(58) Field of Classification Search .............. None
See application file for complete search history.

(56) References Cited

U.S. PATENT DOCUMENTS

| | | | |
|---|---|---|---|
| 5,504,921 A * | 4/1996 | Dev et al. ............... 709/223 |
| 6,069,310 A | 5/2000 | James | |
| 6,138,150 A * | 10/2000 | Nichols et al. ............ 709/219 |
| 6,167,358 A | 12/2000 | Othmer et al. | |
| 6,170,081 B1 * | 1/2001 | Fontana et al. ........... 717/104 |
| 6,505,342 B1 * | 1/2003 | Hartmann et al. ......... 717/104 |
| 6,948,175 B1 * | 9/2005 | Fong et al. ................ 719/331 |
| 6,963,930 B2 * | 11/2005 | Halpert et al. ............ 709/246 |
| 2003/0025738 A1 * | 2/2003 | Polgar et al. ............. 345/835 |

OTHER PUBLICATIONS

Mar. 31, 2003. International Search Report from PCT/US02/29735.
Jun. 19, 2003. Written Opinion from PCT/US02/29735.
Oct. 23, 2003. International Preliminary Examination Report from PCT/US02/29735.

* cited by examiner

Primary Examiner—Kenny Lin
(74) Attorney, Agent, or Firm—Pillsbury Winthrop et al.

(57) ABSTRACT

The invention provides a computer implemented method, system, and computer program device for web-enabling a device. An application for remote monitoring and controlling capabilities may be automatically generated, to enable easy development of embedded applications. The application may be loaded onto a device that is to be web-enabled. The application on the device may offer interaction capabilities from standard browsers. A software modeling tool, e.g., a UML-based tool, supplies mechanisms for annotating software elements, and generating and/or customizing code and/or the user interface and/or device elements to be exposed to the web, thereby providing a fast-prototyping and collaborative environment for research and development teams. The web-enabled device may store a copy of the user interface locally. Preferably, the web-enabled device provides real-time updates of device information while connected to the remote user.

37 Claims, 23 Drawing Sheets

Define Views

Name of view

[Submit] [Reset]

Select All

| Mark | Name | Type |
|------|------|------|
| ☐ | ProcessController[0] | aggr |
| ☐ | ProcessController[0]::modeExtrudeTime | int |
| ☐ | ProcessController[0]::m_iQuality | int |
| ☐ | ProcessController[0]::ExtrudeTime | int |
| ☐ | ProcessController[0]::modeCoolTime | int |
| ☐ | ProcessController[0]::cycles | int |
| ☐ | ProcessController[0]::sendstring | string |
| ☐ | ProcessController[0]::modeMixTime | int |
| ☐ | ProcessController[0]::MixTime | int |
| ☐ | ProcessController[0]::evstart | unari |
| ☐ | ProcessController[0]::evHiQual | unari |
| ☐ | ProcessController[0]::evNormal | unari |
| ☐ | ProcessController[0]::evService | unari |
| ☐ | HWDisplayOutput[0]::evAlertDPOn | unari |
| ☐ | HWDisplayOutput[0]::evAlertDPOff | unari |
| ☐ | HWDisplayOutput[0]::evAlertTankDrainOn | unari |
| ☐ | Displays | view |
| ☐ | Buttons | view |

- Objects Navigation
- Define Views

| ProcessController[0] | |
|---|---|
| modeExtrudeTime | 7000 |
| modeCoolTime | 6000 |
| cycles | 3 |
| sendstring | *Process H  *Process HALT*** |
| modeMixTime | 100 |
| evStart | Activate |

FIG. 15

COMPUTERIZED SYSTEM AND METHOD FOR WEB ENABLING AND/OR WEB MANAGEMENT OF EMBEDDED APPLICATIONS

RELATED APPLICATIONS

This application claims priority to U.S. Provisional Application Ser. No. 60/323,322 filed Sep. 20, 2001, and incorporated herein by reference.

COPYRIGHT AUTHORIZATION

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

BACKGROUND OF THE INVENTION

1. Field of the Invention

The present invention is directed to computer-related and/or assisted systems, methods and computer program devices for web enabling devices, web-enabling applications and/or the monitoring and controlling, via user interfaces, of remote devices. More specifically, it relates to methods and systems for providing a web-enabled application, i.e. enabling the automatic generation and customization of remote controlling and monitoring capabilities, e.g. over the world wide web, for applications running on devices, e.g. having embedded systems, and real-time monitoring and control of such devices, thereby providing enhanced and widely accessible user interface functionality.

2. Description of the Related Art

Disseminating and acquiring a wide variety of information, such as news, sports and prices, by the Internet is already a fact of life, in the office as well as the home. Doing business over the Internet is becoming enormously popular. The accessibility and usability of the Internet pervades our society.

A number of areas remain, however, in which full exploitation of Internet capabilities has not yet been achieved. One such example is in the field of remote monitoring and controlling of various devices, whether at home or in connection with a business. This field is lagging far behind and does not take advantage of the possibilities that Internet technology provides.

A conventional device may be controlled by an embedded system. The embedded system may provide a user interface for control by a user, whether the user interface is a complex set of screens, an LED display, or even a simple set of buttons and indicators. One example of a device with an embedded system is a computer printer, in which the embedded system providing a basic user interface such that a user can manually push buttons, start and stop printing, and otherwise control the printer and examine its status.

Even if a device does not have a user interface, it almost always requires or provides some facility for remote monitoring, remote control, and/or remote debugging. Consider, for example network devices such as switches, routers, telemetry devices, etc. These are fairly well developed in terms of Internet integration. That is, these types of network devices may usually be monitored and configured remotely, such as from the Internet. Type of control may include, for example, the capability to issue control commands and the capability to deliver a software upgrade.

Similar technology may be applied to other devices used in other fields, including commercial, domestic, military, etc. For example, there is no reason why domestic devices, such as cars, telephones, power supplies, refrigerators and other large and small appliances, and so on will not be connectable to the Internet. In the future, this type of connectivity may be ubiquitous.

One barrier that delays such a major change in the way people live and work is connectivity, or more precisely, a lack of connectivity to such devices. Many such devices are not accessible remote, and more only be accessed by a local and/or manually by user.

Nevertheless, there is little question that ubiquitous connectivity is just around the corner. Moreover, having the ability to monitor and control most systems remotely will add yet another significant incentive for connecting devices. In any case, it seems safe to assume that many if not most devices in the future will be computer-enabled, such as via embedded system. With the computer control, such devices will have the technical possibility of supporting connectivity technology.

Unfortunately, even where conventional systems provide the ability to be remotely monitored and/or controlled, these conventional systems fail to provide software tools to provide sufficiently operational interfaces, useful in connection with management of such devices remotely, e.g., over the web. Thus, using conventional systems it is not possible to allow such devices to be conveniently managed. For example, these devices typically require installation of special purpose software to enable monitoring and/or control. A significant drawback is that they cannot be managed by standard web browser from anywhere on the Internet. For these and other reasons, the user interfaces may not be very user friendly. As another example, even if a device may be remotely monitored and/or controlled, it might not provide real-time updates relating to the device. Further, even if remote monitoring and/or controlling is provided, there may be significant limitations to the network with which the system is used, e.g., only limited support may be possible for a complex and/or busy device due to bandwidth limitations. Another limitation to functionality provided may be the capacity of the embedded system on the device. Further, these user interfaces are not conducive to customizing, even if they are customizable.

Hence, there remains a need for such a system and method to alleviate the problems outlined above, and others. There is still a need for the provision of web-enabled applications.

BRIEF SUMMARY OF THE INVENTION

We therefore propose to provide, inter alia, embedded systems and/or interfaces thereto, on such devices with web-based management capabilities, that will allow the devices to be web-enabled, including, e.g., the ability to be managed by standard web browsers from anywhere on the Internet. Consequently, the present invention eliminates many of the deficiencies noted above in connection with conventional techniques and systems.

Aspects of the present invention provide for systems, tools and techniques allowing software developers and/or users easily to create, test, and/or use web-enabled applications in connection with devices including, e.g., embedded systems. In addition, one or more aspects of the present invention provide for binding or otherwise associating software elements in the device application, e.g., an embedded application, to a user interface, e.g., to graphical user interface ("GUI") controls in a hyper text markup language ("HTML") page.

A software modeling tool may serve as a visual development Interface Development Environment ("IDE") and may supply a user with the means of annotating software elements provided by a modeling tool, such as a Universal Modeling Language ("UML") model. Annotations for software model elements are preferably given in a form consistent with the language of the modeling tool, e.g., one or more stereotypes are used for UML language modeling tools. Where the modeling language is UML, predefined stereotype may be selected for software elements such as classes, operations, attributes and events, if appropriate. Where another modeling language is used, predefined annotations for the model elements may be selected. Appropriate software modeling tools are commercially available, including not only UML tools but also others, such as for example the SDL™ modeling tool from Telelogix Corporation, the StateMate™ available from iLogix Corporation, and others.

The software modeling tool may automatically deduce which model element(s) should be visible on a user interface, e.g., a web page for a browser, and/or may deduce which relations between model elements should be displayed such that a natural hierarchy is presented for the user, showing the model elements that exist on the application. Preferably, this display is presented in real-time. The tool may decide which user interface controls, e.g., GUI controls, to associate with the model elements. In any event, the software modeling tool provides a ready way to automatically create a user interface to the device, which enables intuitive interaction from a web page.

Code-generation may be performed by the software modeling tool in order to connect the software model elements to other elements useful for providing remote control. For example, the software model elements may be connected to a package that provides a database and a web-server. The other elements, e.g., the package, may be linked with the application in the embedded system in a target device. Web resource files may be converted, preferably in an automatic manner, to a form suitable for packaging them into the resulting application. The generated application may be self-contained and/or ready to be deployed.

A software tool that enables immediate controlling and monitoring capabilities, from the very early stages of development, particularly one that does not require additional programming and designing, may reduce the cost of developing web-managed embedded applications and make those more affordable.

Such a tool may contribute to the development process by enabling development teams to collaborate. Further, it is anticipated that such a tool may provide the ability, if desired, for support teams to supply services in real-time via the Internet by performing, e.g., remote diagnostics on the device and/or remote repair of problems on the device.

The application running on the embedded system on the device may be accessed from one or more locations. According to one or more embodiments of the present invention, the user interface may present a real-time interface to the embedded application such that the displayed values are automatically updated and/or new values that are entered by the user with respect to the controls on the device immediately affect the application and thus the device. Preferably, updating of the displayed values is done in such a way that minimizes network communication and demands on the application resources.

Working with the software-modeling tool, a developer may iteratively develop the application and test it with the user interface, e.g., a GUI. In an optional development environment, several developers may access the running application on the device and/or manipulate the running application, thereby contributing to a collaborative nature of the development process. The immediate nature of the way the application gains its web-management capabilities in accordance with one or more aspects of the invention may allow debugging to start very early in the development process, for example if no special code needs to be written to communicate with the application on the device.

When the application is ready to be deployed, a web designer or other user/developer may create a specialized user-interface that conveys the look and feel of an embedded device. For instance, special GUI controls representing knobs, meters and lamps may be inserted into a web page and connected to the model elements of the application. The connection may be done from the client-side, e.g., the web designer uses simple application programming interface ("API") calls that enable him to retrieve and set the values of the model elements. This is convenient, since the web designer then may have control over the content and layout of the web page used as the remote user interface for the device.

Upon deployment, support personnel may utilize the remote interface in order to more quickly respond to complaints about the device from clients, to diagnose problems with the device over the Internet, and/or to provide real-time solutions to problems with the device.

The invention provides a method, system, and computer program device for allowing a user to control and/or monitor a device running an application, where the user and user interface are located remotely from the device, in a real-time manner. One or more embodiments of the invention include tagging at least one software element of a model representing the device, wherein the model is intended for running an application on the device, such that at least one attribute is used to designate the at least one software element of the model for export to a network; and providing the device with the application; and responsive to initiation of a user interface, binding the tagged software elements of the model corresponding to the application to the user interface, and establishing communication between the user interface and the device.

According to one or more embodiments of the present invention, while the device is in communication with the user interface, responsive to a user request, the user interface communicates with the application running on the device to obtain current information regarding the device.

According to one or more embodiments of the present invention, while the device is in communication with the user interface, responsive to a user request, a control command is transmitted from the user interface to the remote device application, and the control command is executed at the remote device.

According to one or more embodiments of the present invention, while the device is in communication with the user interface, the user interface receives from the remote device application, information sent to the user interface.

According to one or more embodiments of the present invention, the information is received from the remote device application responsive to a request from the user interface; alternatively the information or is responsive to a change in information at the device.

According to one or more embodiments of the present invention, the tagging is performed utilizing a graphical tag.

Optionally, the tagging is performed utilizing UML stereotypes, and wherein the software model is a UML model. Optionally, the at least one software element is tagged with a predefined stereotype.

According to one or more embodiments of the present invention, the device includes an embedded processor running the application. Optionally, the device includes a host running the application that controls the device.

According to one or more embodiments of the present invention the network is a network of any type, e.g., the Internet, an Intranet, a local area network, and a wide area network.

According to one or more embodiments of the present invention, the user interface functions in connection with a pre-existing browser; there is no need for the end user to install or load special software or a special browser.

According to one or more embodiments of the present invention, a visual modeling tool provides the tagging.

Optionally, one or more embodiments of the present invention include extracting at least a portion of the information from the model and creating code, to be used in connection with the application, that enables the at least one software element to be visible and/or controllable from the network.

Optionally, one or more embodiments of the present invention provides for deducing the topology of the software elements, for use in creating a natural looking hierarchy of objects in the embedded application, which are to be presented on the user interface.

According to one or more embodiments of the present invention, the user interface includes at least one user control, and provides for determining which of the at least one user controls to associate with the at least one software element, whereby a user interface that is suitable for the application is defined.

Optionally, one or more embodiments of the present invention provides, on the user interface, responsive to a user request, for navigating and/or inspecting a plurality of objects in the application and a state thereof. The navigating and/or inspecting optionally includes an expandable and collapsible graphical user interface.

Optionally, one or more embodiments of the present invention includes customizing the user interface by binding, at a computer on which the user interface runs, responsive to a web page of a user interface on the computer being rendered, at least one control and/or monitor in the web page to the at least one software element of the application on the device. Optionally, the control(s) is one of an operation or an event, and the at least one monitor is one of a state, data or value, corresponding to the device. Optionally, the invention further provides for revising a content and/or a layout and/or a binding of the web page.

There is provided, in accordance with one or more embodiments of the present invention, a method, system and/or computer program for allowing a device running an application to be controlled and/or monitored by a user, where the user and user interface are located remotely from the device, in a real-time manner. This includes providing an application for running on a device, the application corresponding to a model, the model having at least tagged one software element, at least one attribute designating the at least one software element of the model for export to a network; and providing the device with the application; and allowing communication between the device and a user interface, and allowing the tagged software elements of the model corresponding to the application to be managed.

According to one or more embodiments of the present invention, while the device is in communication with the user interface, responsive to a request for current information, the application transmits, to the user interface, current information regarding the device.

One or more embodiments of the present invention include, while the device is in communication with the user interface, responsive to a control command, executing the control command at the device.

One or more embodiments of the present invention include, while the device is in communication with the user interface, transmitting from the application, current information regarding the device. According to one or more embodiments of the present invention, the information transmitted from the application is responsive to a request from the user interface. Optionally, the information transmitted is responsive to a change in information at the device.

In accordance with one or more embodiments of the present invention, the device includes an embedded processor running the application. Optionally, the device includes a host running the application that controls the device.

In accordance with one or more embodiments of the present invention, the application includes the topology of the elements.

According to one or more embodiments of the present invention, the application provides the real-time behavior of the application for use in presentation on the user interface, including reducing the load on the CPU and memory resource of the device, by transferring at least a portion of the load to the browser.

One or more embodiments of the present invention provide that, responsive to a request from the user, the device inspects the embedded application and at least one of a plurality of objects in the embedded application and inspects a state thereof.

According to one or more embodiments of the present invention, the device has no peripheral storage device, further comprising a file system in the application, simulating at least one input/output device and/or storage device. Optionally, at least a portion of the user interface is stored in the device. Optionally, the portion of the user interface stored in the device is selected from web resource files, pictures, and HTML files. According to one or more embodiments of the present invention, the user interface has been customized.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature of the technical disclosure of the application. The abstract is neither intended to define the invention of the application, which is measured by the claims, nor is it intended to be limiting as to the scope of the invention in any way. These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be made to the accompanying drawings and descriptive matter, in which there is illustrated one or more preferred embodiments of the present invention.

BRIEF DESCRIPTION OF THE SEVERAL VIEWS OF THE DRAWING(S)

The above-mentioned and other advantages and features of the present invention will be better understood from the following detailed description of the invention with reference to the accompanying drawings, in which:

FIG. 13 is an example user interface according to the embodiment of FIG. 11, for use in defining a GUI for filtering view into the model

FIG. 15 is an example of name-value pairs in aggregate tables, according to the embodiment of FIG. 11.

DETAILED DESCRIPTION OF THE INVENTION

The following detailed description includes many specific details. The inclusion of such details is for the purpose of illustration only and should not be understood to limit the invention. Throughout this discussion, similar elements are referred to by similar numbers in the various figures, for ease of reference. In addition, features in one embodiment may be combined with features in other embodiments of the invention.

Figure 1:
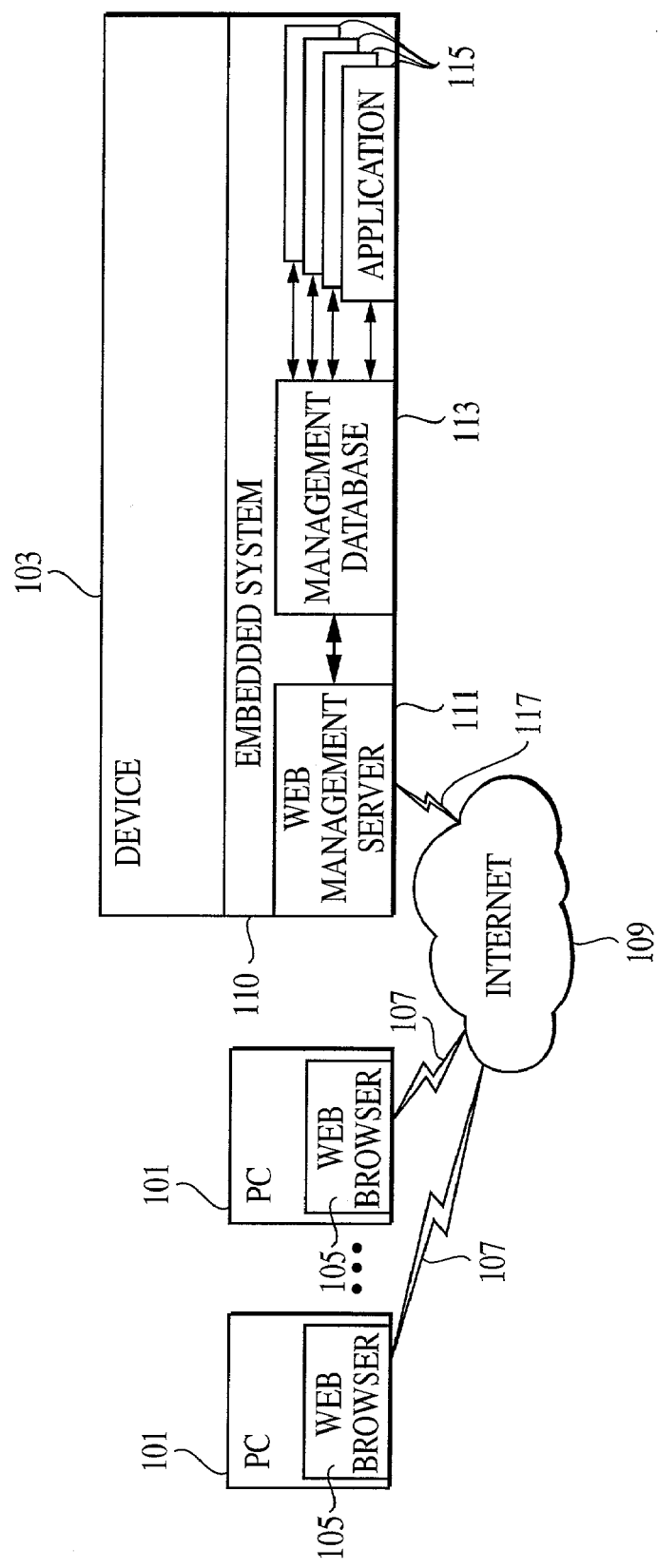
FIG. 1 is a block diagram of one example of a remote system for use of a web-managed embedded application on the Internet, according to the present invention.

FIG. 1 is a high-level description of a system for use in connection with one or more embodiments of the invention. This figure provides an overview of an example network, encompassing web-enabled devices 103 and remote user devices 101, in connection with which the present invention may be used. Although a number of elements are depicted in connection with the network, not all of the elements are required in order to operate the invention. As illustrated in FIG. 1, such a network may include, for example, the Internet 109, and may also includes links 107 between the remote user devices 101 and the Internet 109; and link(s) 117 between the web-enabled device 103 and the Internet 109, enabling communication over the network 109. Other elements may be included to enable the communication, such as an FTP server and/or web server on the user devices 101 and/or web-enabled device 103, communicating with the Internet 107 or other communications network. A remote user may utilize a browser 105 or other user interface on the remote user device, or other appropriate communications medium, for communication of user queries and responses to and from the web-enabled device 111. Optionally, the system may utilize any conventional communication system.

This present invention enables remote control of the web-enabled device 103. The web-enabled device of this example includes an embedded processor on which runs an embedded system 110, which is linked to a user's computer 101 (or other processor), via communication link 107, 117 such as through the Internet 109. The embedded system 110 includes an application 115.

The embedded system 110 may be included on a device, for example, a refrigerator, washing machine, refrigerator, cell phone, a car or anything else that could be networked or connected to the Internet. In this example, there are two PCs 101 each including a web browser 105 connected to the Internet 109. From there, a user may connect to the device 103 itself. For example, a user could connect to the device in the car, and cut the car on and off, etc. As another example, a use with a washing machine at home may connect to it from the office through the Internet. A user with a PC 101 may utilize any convenient computer (such as one in the office), pull up the web browser 105, and if desired, turn on the dishwasher device 103 at home, by connecting 107 through the Internet 109, and then by connecting 117 to the embedded system 110, that would be, for example, in the device 103 such as the dishwasher.

More particularly, the connection may be made to the embedded system 110 or other controller, e.g., the computer that is in the dishwater. An embedded system conventionally includes other software useful for operation, e.g., a real time operating system, and perhaps other software applications. The embedded system communicates with the device, and is likely to be located physically inside the device, e.g., a computer chip in the dishwasher. However, the embedded system may be located externally and communicating with the dishwasher, or otherwise controlling the device.

The embedded system 110 includes a web management server 111, which preferably handles communications; a management database 113, which preferably provides storage and/or includes the information that is used to run the system and communicate; and one or more applications 115. In other embodiments of the invention, the logical distribution of such tasks may result in a different configuration of different components.

In this example, the application 115 has multiple connections, each directed to different aspects of the application. Consider, for example, the dishwasher, in which perhaps the aspects of interest and control are "dishwasher on" and "dishwasher off." Other aspects or settings are possible, but might not normally be of interest. For example, normally a user would not be interested in the aspect of how many hours total the dishwasher works.

The device, e.g., the dishwasher may communicate with the Internet through any appropriate medium. For example, the device may be connected directly or indirectly to the network, e.g., via a wire or wireless connection to the Internet, wireless routers in the house, etc. The method of connection may be anything appropriate. Devices for use with the present invention may include washing machines, refrigerators, cars, other consumer items, commercial items, such as telecommunications controllers, routers, etc. The invention is not limited to these. It may be used with any device with an embedded computer and remote access. Embedded computers are pervasive in devices of all types.

Figure 2:
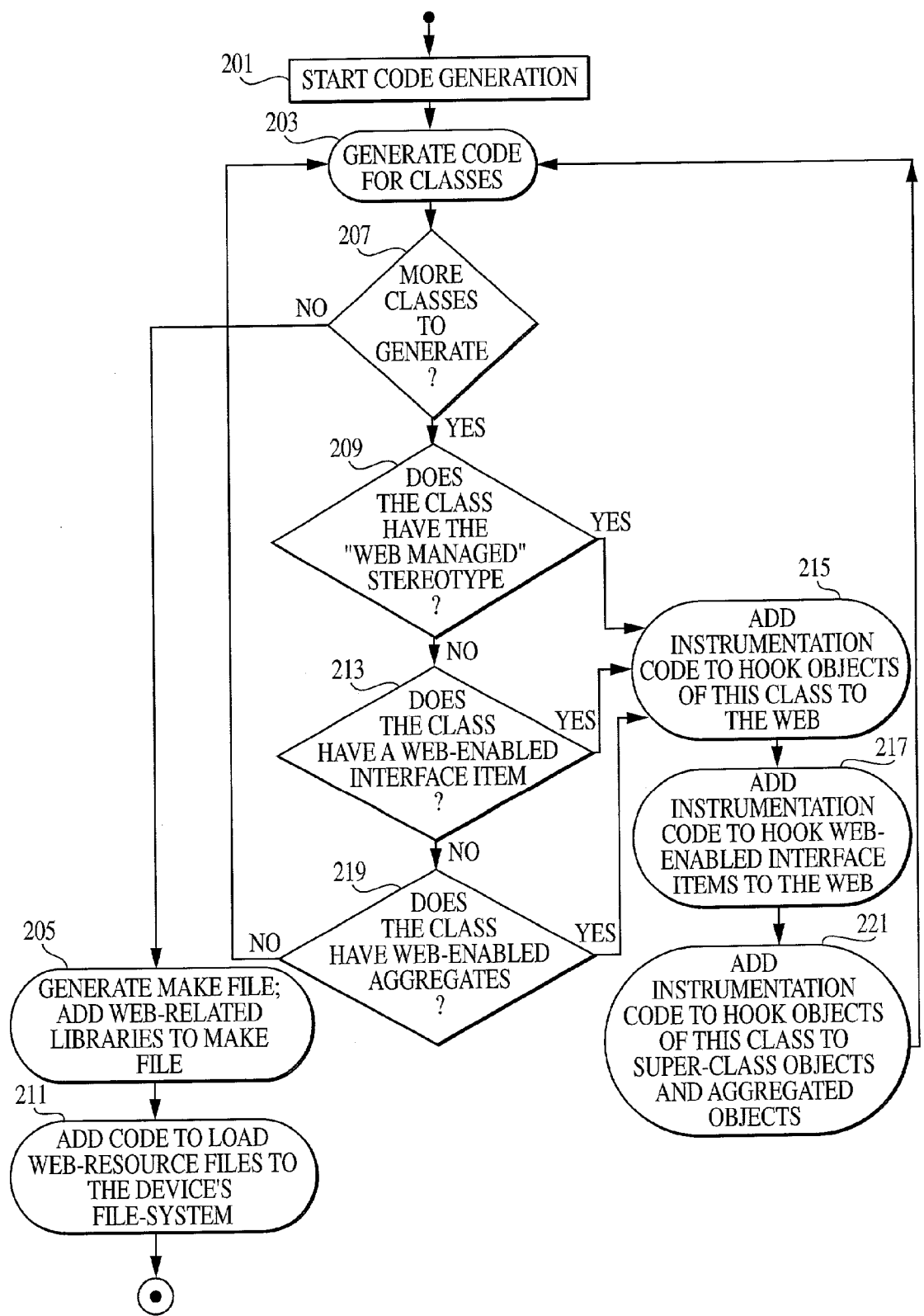
FIG. 2 is a flow chart illustrating one example of a process of generating code for a web-enabled device, for use in connection with the present invention.

In accordance with the invention, the device used in connection with the invention has been web-enabled. This may be accomplished by utilizing any appropriate commercially available package. Alternatively, the device may be provided with a web-enabled feature. Reference is made to FIG. 2, illustrating one example of an available code generation process to make a device web-enabled, in this case encompassing the upward propagation of a web-enabled property. A web-enabled device may include a web-enabled application that defines how the device should work, including how it should react to monitoring and/or control. The user has generated the application and loaded it into the device, in this example the dishwasher. When a user creates the model of the system and how the system should look, this includes determining the aspects of the device to expose to the user via the web. Any available modeling tool, such as those mentioned herein, generates the code to expose to the user interface. Additionally, the application may be web defined, such that those identified data of the application, may be seen from the outside, such as via the present invention.

On the other hand, a system according to the present invention is aware of the different instructions that are specific for the embedded system that is to be accessed remotely. A user would utilize the modeling tool to indicate that remote access and/or control should be given to, e.g., the on/off button, and whether it is finished or not. The modeling tool will generate the application, and certain aspects of the present invention will allow users from the web to see the on/off button and the start/stop of the dishwasher. The modeling tool provides an inventory the user may choose from, with regard to the application and what he wants to see. The modeling tool generates all the need components, beginning with code generation block 201. At block 203, it generates code for classes. For each class to be generated, 207, if this class has a web-managed stereotype 209, or has a web-enabled interface item 213, or has a web-enabled aggregate 219, then the system proceeds to web-enable (blocks 215, 217, 221). For each class, if there are more classes (e.g., object classes) to generate at block 207, the system generates a makefile, and adds web-related libraries to the makefile at block 205. At block 211, the system adds code to load web-resource files to the devices file system. These would then be objects that are related to the device, e.g., the dishwasher.

At blocks 215, 217 and 221, the code becomes web-enabled. At block 215 the system adds instrumentation code to hook objects of this class to the web. At block 217, the system adds instrumentation code to hook web-enabled interface items to the web. At block 221, the system adds instrumentation code to hook objects of this class to superclass objects and aggregated objects. When completed, the system has generated object classes that relate to the web-enabled device, which are ready to for further use. At this point, one has a complete application for the device, e.g., the dishwasher. The dishwasher will operate when it is connected to the Internet.

Figure 3:
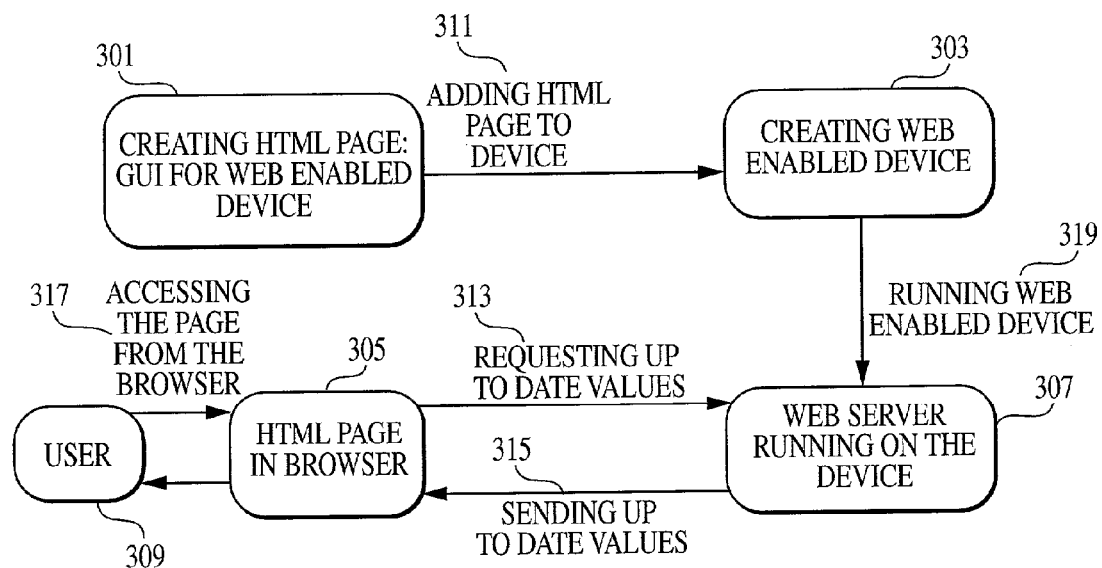
FIG. 3 is a state chart, illustrating an example of creation and operation of the web-enabled device in accordance with the present invention.

Reference is made to FIG. 3, a state chart illustrating one or more embodiments of the present invention. In a first state 301, the user interface, e.g., a GUI with an HTML page, is created on a user's computer, for the web-enabled device. At transition 311, the HTML page is added to the device, thereby transitioning to state 303, where the web enabled device is created. At transition 319, the web-enabled device runs, thereby transitioning to state 307, where the web server is running on the device. Meanwhile, the user 309 is interacting with the HTML page, now loaded in the user's browser 305, by accessing the page from the browser 317. The brower issues request to update values 313 to the web server running on the device 307, the web server sends up to date values 315 to the HTML page in the browser 305.

This process of creating the page for the user interface may be done on the user's computer. Alternatively, there may be a development computer on which a developer works, such that the developer downloads the device, and the device is manufactured en masse. From any web browser any web Internet Explorer, Netscape, etc., a user then may connect to the web-enabled device.

According to one or more embodiments, the ultimate end user connects to the device via a user-friendly interface. For example, a user could access a web site, e.g., <www.myhome.com>, under which they have registered, in order to be connected automatically to the device, e.g., the user's dishwasher. In this example, the user is not required to load a special user interface; the web-enabled device may be accessed through a standard browser already existing on the user's computer.

At state 301, the developer creates the page, and then adds the page to the device by loading it at transition 311. The user 309 then may interact with the web browser 305, and the user asks for information concerning the device. The browser is preferably a standard browser, e.g., Microsoft Internet Explorer™, Netscape Navigator™, AOL™, iCab™, MSN Explorer™, etc., which preferably is already installed, so that advantageously no special software need be loaded. The browser 305 sends a request for a data value to the web server running on the device 307. The device sends back to the web browser 305 the data value, and the web browser may display that value to the user.

Figure 4:
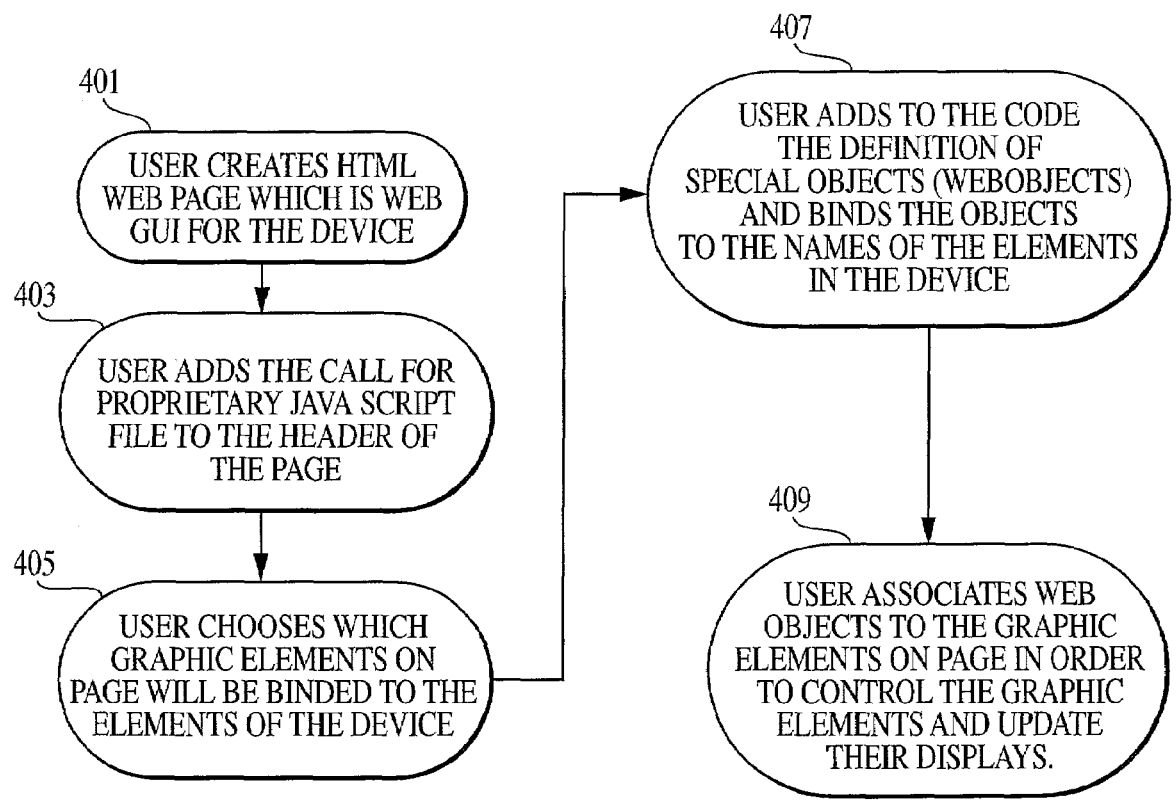
FIG. 4 is an activity diagram, illustrating an example of a process of a user customizing a user interface HTML page for a web-enabled device graphical user interface, in accordance with the present invention.

States 301 and 303, and transition 311, relate to the creation of the web-enabled device. On the other hand, states 305 and 307, and user 309, and transitions 313, 315 and 317 relate to the remote access and/or control of the web-enabled device Reference is made to FIG. 4, an activity diagram illustrating an example of a process of a user customizing a user interface HTML page for a web-enabled device graphical user interface, in accordance with one or more embodiments of the present invention. At block 401, the user creates the user interface for this device, such as the html web page, e.g., the web GUI, as discussed above. Generally, the system may automatically create the user interface. On the other hand, if a user desires to customize their interface, one or more embodiments of the present invention provide a way to accommodate such preference and allow the user to customize such web page(s). As previously described in connection with automatic creation of the user interface, in one or more embodiments of the present invention, a user minimally indicates the aspects of the device to be exposed, and the system creates the user interface, e.g., the web page, utilizing these selections. This may be done automatically.

Optionally, a user may want to create their own user interface and still control the device. The customized interface might include custom colors/fonts, a company's logo, a picture of the device itself, and buttons connected to resemble their physical locations, etc. One or more embodiments of the present invention allow such customization. For example, if the interface is an HTML page, the system may provide and/or connect the appropriate hooks.

According to one or more embodiments, at block 403, the user adds the call for proprietary java script file to the header of the page. At block 405, the user chooses which graphic elements on the page will be binded to the elements of the device. At block 407, the user adds to the code the definition of any special object(s) (WebObjects) and binds (or otherwise associates) the objects to the names of the elements in the device. Then, at block 409, the user associates the WebObjects to the graphic elements on the page, in order to control the graphic elements and update their displays. If preferred, a user-friendly interface may be provide to insulate the user from the technical activity, such that the user may initiate the above actions in any intuitive manner, e.g., by dragging and dropping screen elements. E.g., a user may mark on their application which elements they want to see, adding and/or eliminating elements. Optionally, they may put the skill on top of that, which is called "the customize," which determine how the user views the skill.

The present invention optionally provides a dynamic mechanism whereby the user interface is updated, to better provide a real-time reflection of the device. In a conventional system, web pages are not updated. For example, on Netscape or Internet Explorer, the page is a static page; although the banners are moving, they are not really active; one must refresh the page to update the data. According to one or more embodiments of the present invention, on the other hand, the web pages continue to be dynamic, so if something changes on the device, e.g., the dishwasher finishes the rinse cycle, then the dishwasher will transmit this change to the user interface and it will be displayed on the user's web page without the need for, e.g., a refresh button. Therefore, the system preferably will reflect, in real-time, the status of the device, for example by the device sending information on its state following a state change. The user interface could alternatively be updated, e.g., by periodic polling of the device, or by the device sending status updates. Preferably, to be efficient, the device sends a restricted set of information, e.g., just the data that changed or a short set of data including what changed. Alternatively, the device may send additional information, e.g., the current state of the entire device.

The ability to have the user interface reflect the updated status of the device becomes more important for a complex device, e.g., a router center, which has numerous parameters. In such a situation, a user will want a constantly updated display. It is impractical for a user sitting in a control center to hit the refresh button constantly.

Figure 5:
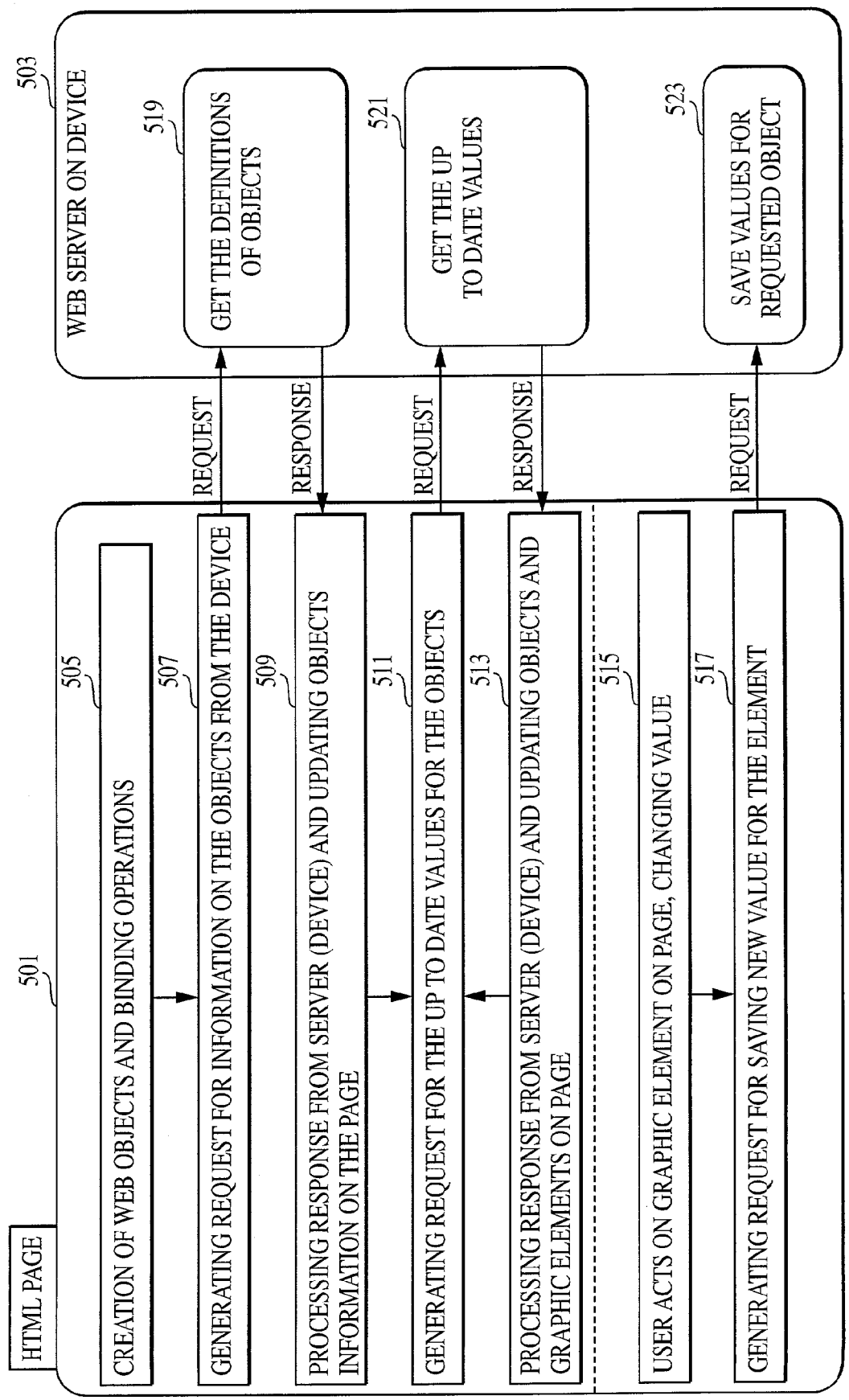
FIG. 5 is a block diagram illustrating an example of the data flow between a web-enabled device on the device side, and a remote user interface HTML page on the user side.

Reference is made to FIG. 5, a block diagram illustrating an example of the data flow for one embodiment of the present invention, between a web-enabled device on the device side, and a remote user interface HTML page on the user side. Generally, the user side may get information about the device (e.g., definitions of objects for the device), may get current values from the device, and may transmit modifications and/or instructions to the device. These processes are advantageously implemented to run in parallel. Block 501 represents the user side, specifically the user interface, here an HTML page; and block 503 represents the device side, here the web server on the device. When the HTML page is brought up, at block 505 on the user side, web objects and binding operations are created. Then, at block 507, a request is generated for information on the objects on the device, e.g., object definitions, and the request is transmitted to the device. At block 509, the response is received from the device, processed, and objects information are updated on the user interface. These two blocks 507, 509 are repeated. Meanwhile, at block 511, a request is generated for the current values for the objects, and transmitted to the device. At block 513, the response is received from the device, processed, and objects and graphic elements on the user interface page are updated. These two blocks 511, 513 are repeated, generating requests for current device values. Meanwhile, at block 515 on the user side, the user acts on a graphic element on the page, e.g., changing a value. At block 517, a request is generated for saving the new value for the element, and transmitted to the device. The user side loops back to block 515, repeating these two blocks 515 and 517.

Referring now to the web server on the device 503, the remote device receives, e.g., via the web server, and responds to requests, e.g., for object definitions, for data values, and to instructions to modify values. At block 519, the device receives a request, and determines that it is a request for information; responsive to the request, the device obtains the requested information and transmits a response. At block 521, the device receives a request, and determines that it is a request for up-to-date values; responsive to the request, the device then obtains the values and transmits a response with the values. At block 523, the device receives a request, and determines that it is a request to save new values; the device then saves the values for the requested objects. These blocks may advantageously be implemented to run in parallel. One will appreciate that different protocols, packet formats, etc. may be utilized to implement the process of providing instructions and requests to a remote device, and/or for receiving unsolicited information from the remote device.

Figure 6:
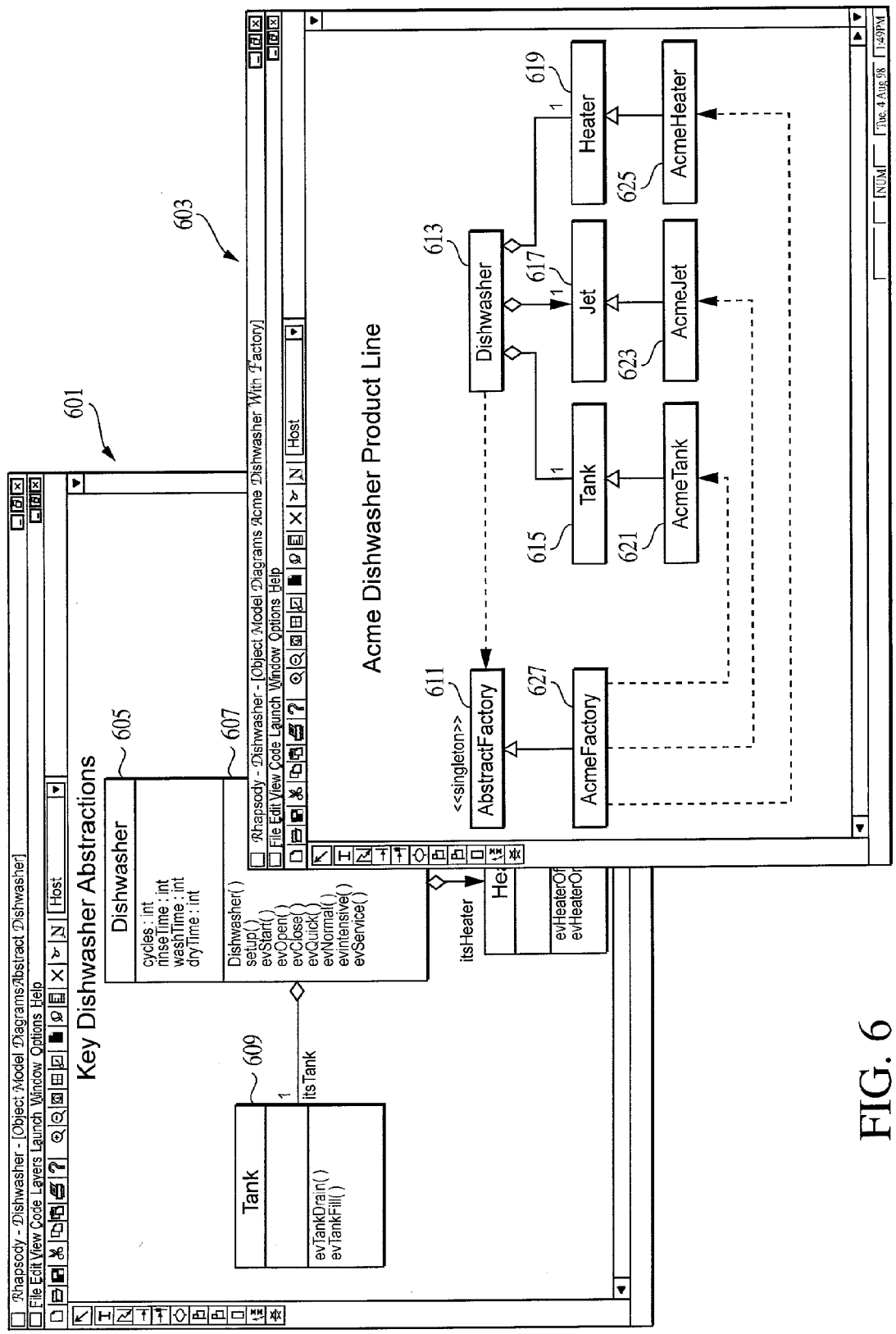
FIG. 6 is an example of two user interfaces in connection with creating a web-enabled device, here, a dishwasher.

Reference is made to FIG. 6, an example of two user interfaces in connection with creating a web-enabled device, here, creation of a dishwasher application via an available modeling software. This may be used to set the stage for the present invention. Two object diagrams 601, 603 are illustrated, specifically, block diagrams showing the entities in the dishwasher application itself. The block diagram 601 lists the attributes of the device 605, e.g., cycles, rinse time, wash time, and dry time; the events relevant to the device 607, e.g., setup, start, open, close, quick, normal, intensive, and service; and at least one component 609, e.g., a tank. The block diagram 603 shows an example of data flow between components of the device, e.g., the dishwasher 613, for which the components are a tank 615, jet 617, and heater 619. Each of these components may receive information from the Factory 611, via the controlling factory, depending on the type or category 621, 623, 625 of component. This is just a simple example of a possible dishwasher application. As one can see, the device has events, states, and components which themselves may have events, states, and components, and so on.

Figure 7:
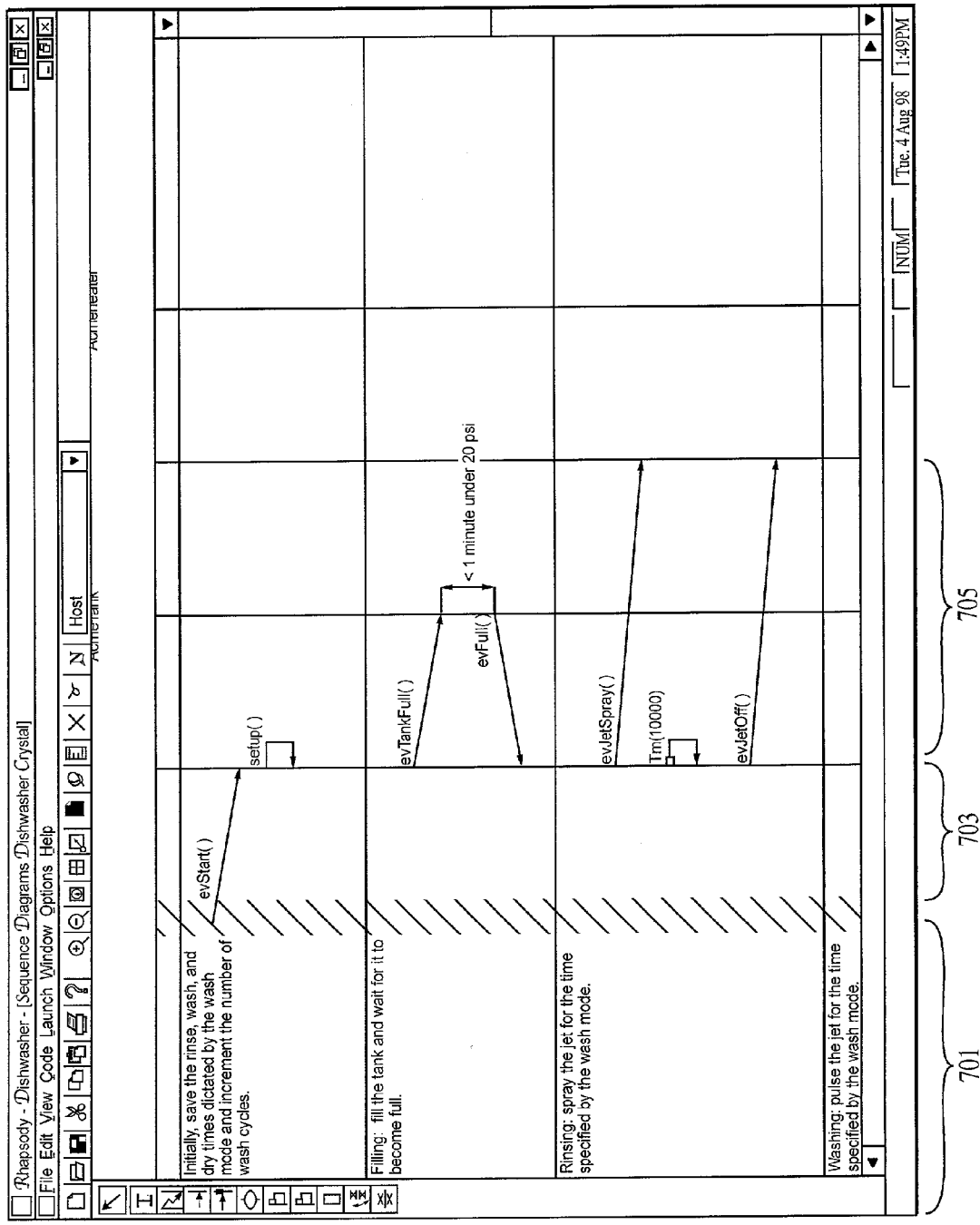
FIG. 7 is a sequence diagram corresponding to the example of FIG. 6.

FIG. 7 is a sequence diagram corresponding to the example of FIG. 6. In this example, the dishwasher should start, then set up, and then fill up the tank, according to the illustrated flow of events. When the tank is full it should send an event indicating "full" back to the dishwasher, then stop, etc. as a dishwasher should normally work. This figure simply provides another illustration of how this particular device should work, according to the application.

Figure 8:
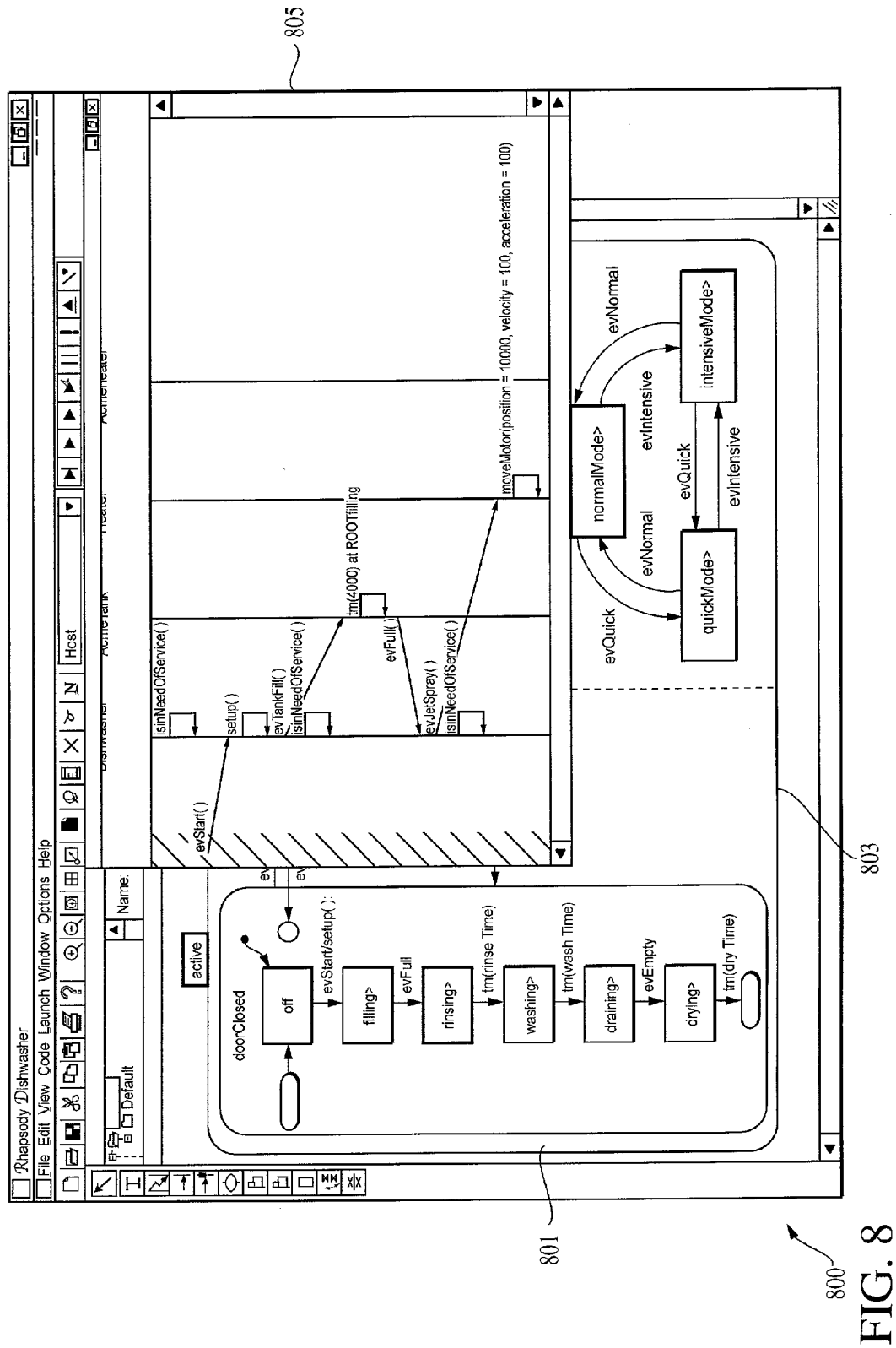
FIG. 8 is an example user interface describing how the behavior of the web-enabled device of FIG. 6 is defined, including two different state diagrams and a services model.

FIG. 8 is an example user interface 800 describing how the web-enabled device of FIG. 6 should behave, including two different state diagrams 801, 803 and a services model 805. FIG. 8 is again a description, in another way, of how the dishwasher should behave.

Figure 9:
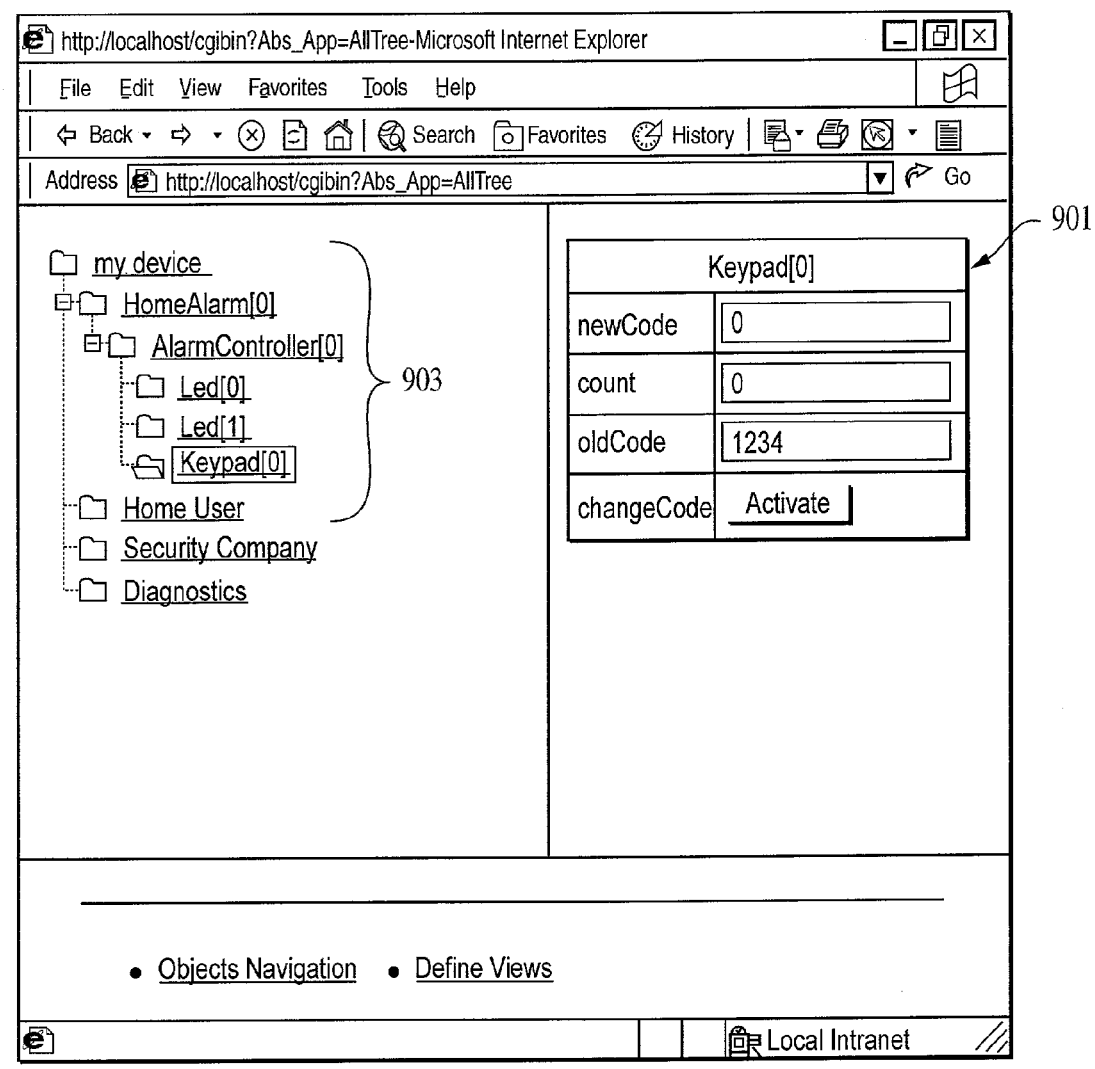
FIG. 9 is an example of a user interface to a web-enabled device.

FIG. 9 is an example of a user interface 900 to a web-enabled device. FIG. 9 illustrates the user interfacing over the Internet with their web-enabled device. FIG. 9 is an example of a user interface to a web-enabled device. Here, the device is a home alarm. In this optional example, the user interface 900 includes a portion 903 showing the Home Alarm, its components, and their subcomponents. The user interface also includes a display 901 of the device. In this example, the display includes an approximation of the keypad on the alarm.

The high level of the application dishwasher similarly has an on/off. The user may take this model, which is high level, and indicate on it what he wants to web-enable. The application will then become web-enabled. The present invention thus includes, according to one or more embodiments, a dynamic web-enabled application.

In FIG. 9, one sees another application called the home alarm. On the browser, one sees these attributes: new code, count, old code, and change code. These will be web-enabled, first by proceeding with code generation. Then, the code is run on the application in the user's computer, e.g., on the Internet Explorer, with the device as a remote application. From this interface, a user may control the device, e.g., set the home alarm. In display 901, the user may need to enter a code to activate, and may change the code on the home alarm remotely.

Figure 10:
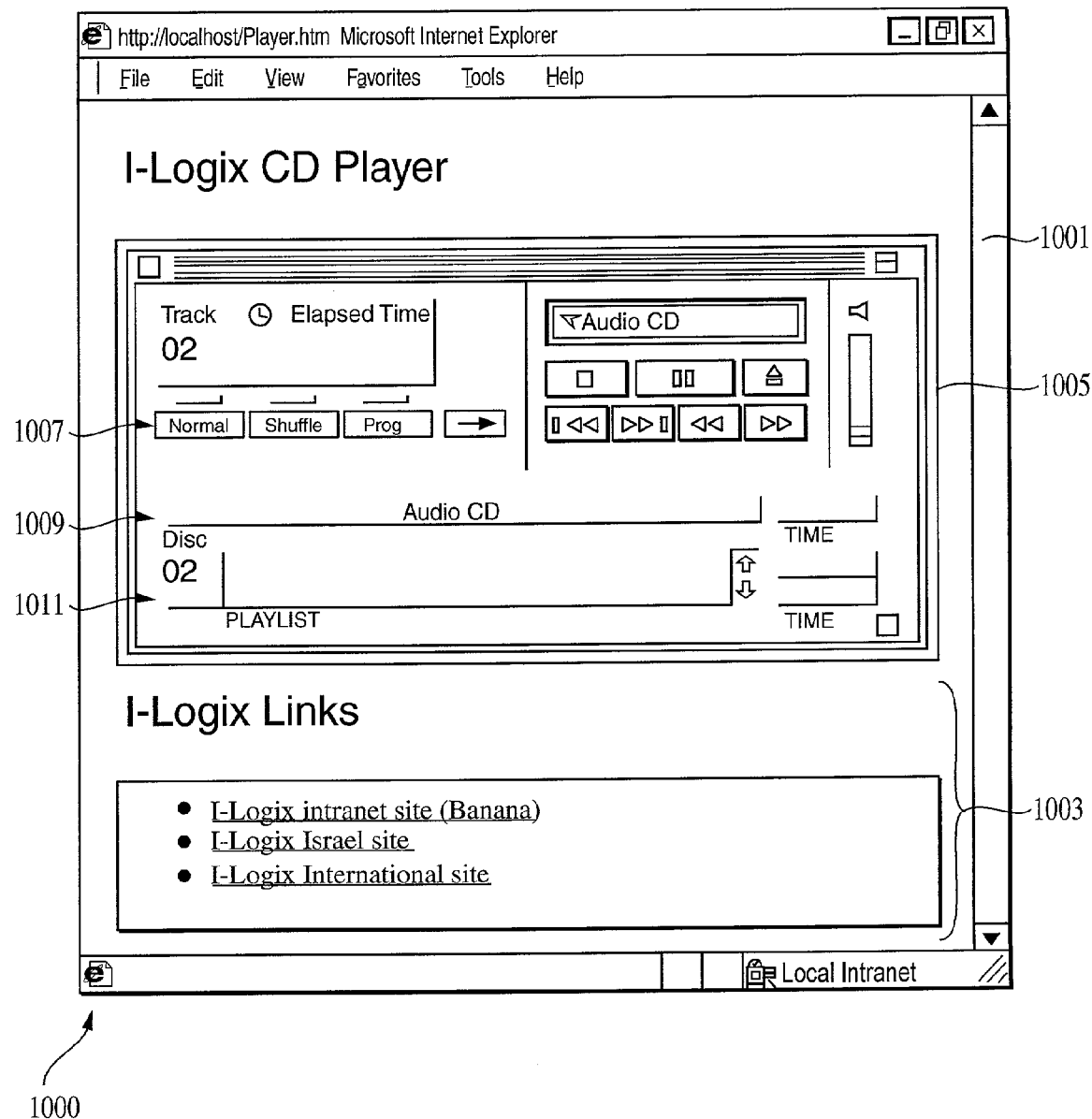
FIG. 10 is an example of a customized user interface to a web-enabled device, in this case a CD player.

FIG. 10 is an example of a customized user interface 1000 to a web-enabled device, in this case a CD player. This interface 1000 includes the CD Player controls 1001, as well as other items which may be displayed, e.g., links 1003. The controls include the usual buttons displayed on a CD, e.g., Audio CD 1005, Track, elapsed time, etc. 1007, a replica of the device interface 1009, and a playlist 1011. Naturally the types and format of controls and other items displayed in a custom interface may be selected to correspond to the appearance of the device. This is useful, e.g., to correspond to the user manual. It is also more natural and user friendly, as the user does not need to learn multiple interfaces. The aesthetics, such as color and font may also be adjusted. This is a custom interface to the application on the device that may be accessed remotely. The user may then operate the controls remotely just as they are operated directly on the device. The user could be, e.g., in another room in their house or even elsewhere. As illustrated, the user may fully customize a web page, if desired. Instead of controlling the user's CD player in his computer, he is controlling a CD player in the other room, e.g., by adjusting the volume. Here also, the display may be adjusted to display what the device is displaying, and preferably displays that information in a real-time manner, as discussed previously.

The following is an example of one or more embodiments of the present invention:

© 2002 iLogix

The following section describes the process of managing Rhapsody™-built embedded software via the Internet. It examines how, in the development process, to set components as Web-enabled, and how, in the maintenance process, to monitor, control, and make changes to embedded software. This section also includes how to specify preferences in the automatically generated Web pages, which serve as an interface for updating or changing Rhapsody™-built software.

Introduction

Web-enabled devices contain Rhapsody™-built embedded software that you can monitor and control remotely, in real-time, from the Internet. After assigning Web manageability to a model's elements and running the code for that model, Rhapsody™ automatically generates and hosts a Web site that accesses the application's components through a built-in Web server. The Web pages created by running Web-enabled Rhapsody™ code serve as a graphical interface for the management of embedded applications. By using the interactive functionality of this interface, you can remotely control the performance of devices.

Although Web-enabling requires no knowledge of Web hosting, design, or development, development teams that want to refine the capability or appearance of their Web interface can do so using their favorite authoring tools.

Besides its ability to remotely manage devices, Web-enabling a device offers the following benefits to the development process:

- The Web-browser serves as a window into the device, through which you look into the model to see how a device will perform, eliminating the time-consuming development of writing protocol and attaching hooks that report performance information.
- The graphical interface provides additional testing on-the-fly and debugging through visual verification of the state of a device before shipping to a manufacturer.
- Its easily created interfaces, exposed via the Internet, serve as visual aids in collaborative planning and engineering and provide a vehicle for rapid prototyping of an application during development.
- Its capability to filter views can focus customer-specific aspects of a model.
- Its capability to constantly refresh only changed values and statuses does not overtax device resources.

To Web-enable software, you perform several tasks from both the server side (in Rhapsody™) and the client side (from the Web GUI). In Rhapsody™, you select which elements of a model to control and manage over a network, and assign Web-enabling properties to those elements, then generate the code for the model.

To manage the model from the Web GUI, navigate to the URL of the model. Pages viewed in a Web browser act as the GUI to remotely manage the Rhapsody™-built device. You can control and manage devices through the Internet, remotely invoking real-time events within the device. Teams can use the Web-enabled access as part of the development process—to prototype, test on-the-fly, and collaborate—or to demonstrate a model's behavior.

Setting Model Elements as Web-Manageable

The first step in Web-enabling a working Rhapsody™ model is to set elements of the model for Internet exposure. Within a working Rhapsody™ model, select which elements of the device's application that you want to control or manage remotely through a Web browser, and assign Web-managed properties to those elements.

Limitations on Web-Enabling Elements

At the design level, you might find workarounds for building Web-managed models around elements currently not supported by Web-enabling. For example, to Web-enable an event with an argument (not yet supported), create an operation with an argument (supported), and call the event from within the body of this new operation.

The following table lists Rhapsody™ elements and whether they can be Web-enabled.

| Element Type | Support and Restrictions |
|---|---|
| Attributes | Supported types include char, bool, int, long, double, char *, OMBoolean, OMString, RiCBoolean, and RiCString. Arrays are not supported. Attributes must have either a getter or setter, or both. |
| Operations and events | Operations, triggered operations, and events without any arguments, or one argument, are supported |
| Classes | Selected objects within classes must be set as Web-enabled. Web-enabling a class does not Web-enable all the child objects of the class. |

-continued

| Element Type | Support and Restrictions |
|---|---|
| Native types | Short and all unsigned types (unsigned char, unsigned int, unsigned short, and unsigned long) are supported. |
| User-defined types | Not supported. |
| Global variables | Not supported. |
| Global functions | Not supported. |
| Packages, components and diagrams | Not supported. |

Note the following restrictions:
- You are limited to 100 Web-enabled instances per model. Depending on the element type, enabling one element might enable multiple instances.
- Code generation for Web management is available only for Rhapsody™ in C and Rhapsody™ in C++, not Rhapsody™ in J.
- Microsoft, VxWorks, and Solaris are the currently supported environments for Web-management.
- C-style strings (char*) and RiCString types might cause memory leaks. Setting new values for this type of string from the Web interface assigns newly allocated strings to the attribute. Be sure to properly deallocate this memory. Note that OMString will not cause memory leaks.
- C unions, bit fields, and enumerations are not supported.
- C++ templates and template instantiations are not supported.

Selecting Elements to Expose to the Internet

The first step in Web-enabling a working Rhapsody™ model is to set its components and elements as Web-manageable. When considering which elements to Web-enable within a model, keep in mind the current restrictions and limitations (see "Limitations on Web-Enabling Elements").

Figure 11:
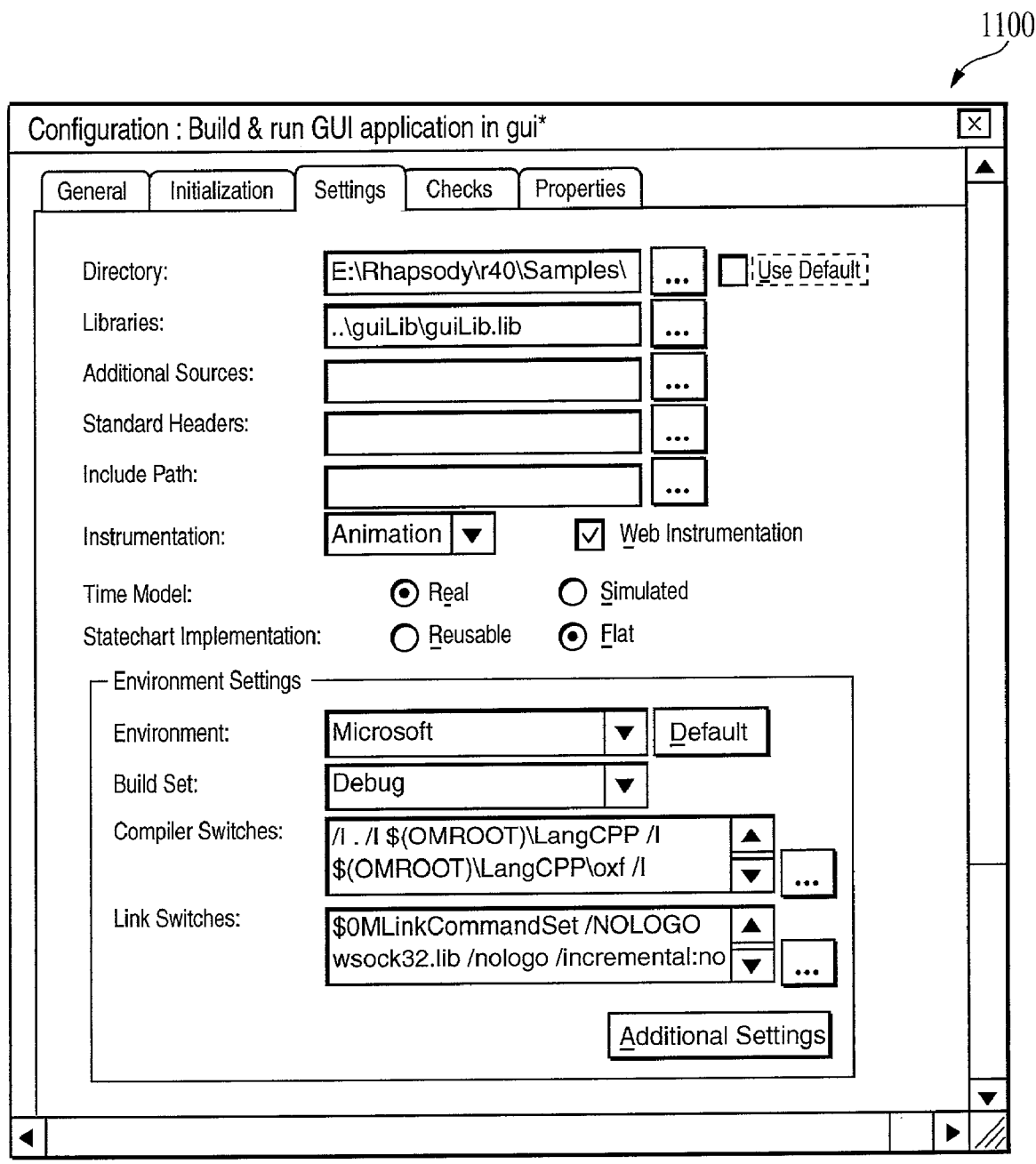
FIG. 11 is an example user interface according to one embodiment of the present invention, for use in exposing a working model to the web.

To expose your model to the Web, with reference to the user interface 1100 in FIG. 11, do the following:

1. In the browser, navigate to Components><Component Name>>Configurations. Choose an active configuration belonging to an executable component.
2. In the Features dialog box, click the Settings tab.
3. Check the Web Instrumentation box. This enables Web-enabled code generation for the configuration.

Repeat this procedure for all library components containing Web-enabled elements.

4. Navigate to the elements within a package that you have decided to Web-enable.
5. Double-click the element to open its Features dialog box.
6. Set the stereotype to <<Web Managed>>. Do this for each element you want to view or control from the Internet.

If the element already has an assigned stereotype, you need to Web-enable it through a property, as follows:

Right-click the element and select Properties from the pop-up menu.

Select WebComponents as the subject, then set the value of the WebManaged property within the appropriate metaclasses to True.

Currently, the supported metaclasses for the WebComponents subject are Attribute, Class, Event, File, and Operation.

7. Generate the code for the model, build the application, and run it.

Connecting to the Web Site from the Internet

Rhapsody™ comes with a collection of default pages that serve as a client-side GUI to the remote model. When you run a Web-enabled model, the Rhapsody™ Web server automatically generates a Web site, complete with a file structure and interactive capability. This site contains a default collection of generated on-the-fly pages that refreshes each element when it changes.

Navigating to the Model through a Web Browser

After generating, making, and running a Rhapsody™ model with Web-enabled objects, open Internet Explorer (version 4.0 or later).

For Applications Running on Your Local Machine
In the address field, type the following URL:
http://<local host name>
In this URL, <local host name> is the "localhost", machine name, or IP address of your machine.
By default, the Objects Navigation page will load in your Web browser.

For Applications Running on a Remote Machine or Server
In the address field, type the following URL:
http://<remote host>
In this URL, <remote host> is the machine name or IP address of the machine running the Rhapsody™ model.
By default, the Objects Navigation page will load in your Web browser.

Troubleshooting Problems

If you have trouble connecting to a model through the Internet, verify the following:
You have IP access to the server you are trying to access.
You have Web-instrumented the active component.
You have Web-enabled the individual elements.
By default, Web-enabled Rhapsody™ models listen on port 80. Make sure you are currently not running another HTTP protocol application listening on the same port, including another Web-enabled Rhapsody™ model, or personal Web server. See "Customizing the Rhapsody™ Web Server" below for how to assign models to different ports.

Connecting to Filtered Views of a Model

If you know the HTTP address of a filtered view of a model, you can initially connect to a model through that view. If you want to monitor or control only certain behaviors of a device from one tailored Web GUI page, you go directly to that page using this method. Rhapsody™ does not yet support access controls, so providing access to filtered views should be done for the sake of convenience only, because it is not secure.

For information on filtering Web GUI views, see "The Define Views Page" below.

The Web GUI Pages

The default Rhapsody™ Web server comes with a collection of pages, served up on-the-fly. These pages populate dynamically and contain the status of model elements and present different capabilities and navigation schemes.

The GUI includes the following pages:
The Objects Navigation Page• The Define Views Page• The Personalized Navigation Page• The Upload a File to Server Page• The Statistics Page• The List of Files PageThe Objects Navigation Page The Objects Navigation page provides easy navigation to Web-exposed objects in a model by displaying a hierarchical view of model elements, starting from top-level aggregates. By navigating to, and selecting, an aggregate in the left frame of this page, you can monitor and control your remote device in the aggregate table displayed in the right frame.

This page serves as an explorer-like GUI wherein aggregates appear as folders and correspond to the organization of objects in the model. For information on reading and using aggregate tables, see "Viewing and Controlling a Model via the Internet".

Figure 12:
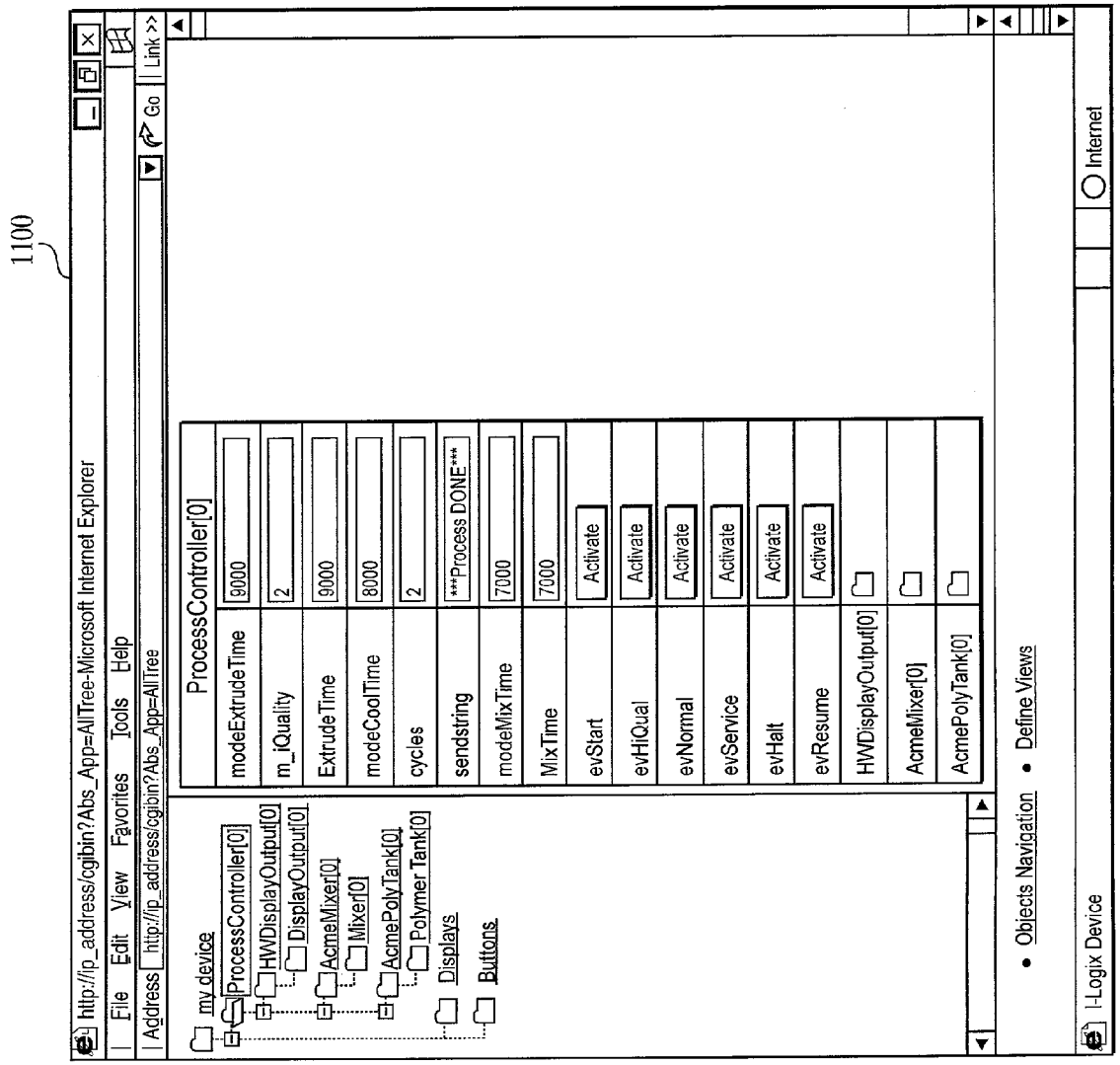
FIG. 12 is an example user interface according to the embodiment of FIG. 11, for use in connection with objects navigation of the web-exposed objects.

When you select an object in the browser frame, it is displayed in the right frame. The status and input fields of objects in the selected aggregate populate the table dynamically. The left column of the table lists the name of the Web-enabled object; the right column lists the corresponding real-time status, input field, activation button, or folder of child aggregates. For information on controlling a model through an aggregate table, see "Customizing the Web Interface". FIG. 12 shows the Objects Navigation page.

The bottom frame in this page contains links to the other automatically generated pages of the Web GUI to manage embedded devices. These links appear at the bottom of all subsequent pages of the default Web GUI and can be customized with your corporate logo and links to your own Web pages.

The Define Views Page

The Define Views page, shown in FIG. 13, provides a GUI for filtering views into the Rhapsody™ model. These views can simplify monitoring and controlling maintenance and help you focus on key elements of your models.

The Define Views page enables you to create and name a view of selected elements. The page includes a list of checkboxes beside all the available elements that can be included in the view, and their corresponding element types. Click on each element or aggregate to drills down to a graphical representation of the element value, or its aggregate collection of name-value pairs.

To design a view, do the following:
1. Check the boxes beside each element you want to include in your view. To include all elements, click Select All.
2. Type the name of your view in the Name of view field.
The Reset button clears the name you entered and all of your selections.
3. Click Submit.

The new view name appears at the bottom of the element table, next to its checkbox, with "view" as its type.
Note: All views created from the Design View page store in memory and will not be saved when you close Rhapsody™. See the example and readme file provided in <Rhapsody>\MakeTmpl\Web\BackupViews.

The Personalized Navigation Page

Figure 14:
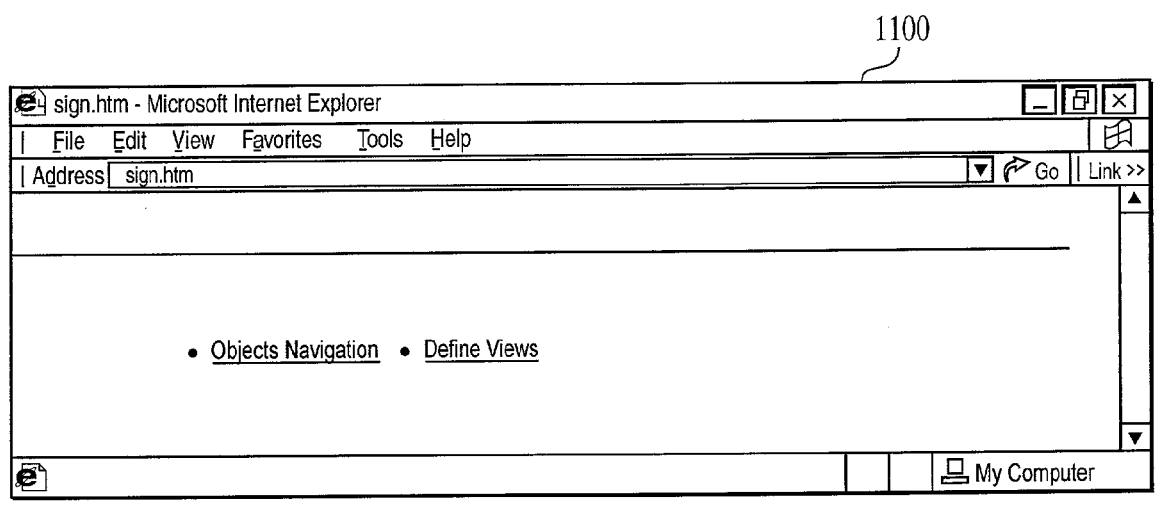
FIG. 14 is an example user interface according to the embodiment of FIG. 11, for use in customizing the interface and adding information about the model.

The Personalized Navigation page, shown in FIG. 14, enables you to customize your Web interface and add links to more information about your model. This page, conveniently provided as an HTML page, can be opened and viewed for design testing.

Using this page, you could add hyperlinks to the bottom navigation of your Rhapsody™ GUI, such as a link to e-mail comments to a customer support mailbox. By default, the file includes two links (to the Objects Navigation and Define Views pages) whose addresses are displayed within anchor tags.

To customize the bottom frame of the Web GUI, do the following:
1. If you need a general template to edit, right-click on the bottom of the Rhapsody™ Web GUI, and grab the source code.

2. Design the page to your liking, adding your logo and links and adjusting the table structure in the file to accommodate your changes.
3. Rewrite the default file with your own by uploading it to the Rhapsody™ Web server, either through the Rhapsody™ interface or through the Upload a File to the Server page. For more on uploading files to the Web server, see "The Upload a File to Server Page".

If you do not want to overwrite the default sign.htm file, upload your own .html file to the Rhapsody™ Web server and call your new file from within the Rhapsody™ Web configuration file by adding the following function call:

SetSignaturePageUrl(<name of your new file>)

Viewing and Controlling a Model via the Internet

Controllers manage Rhapsody™-built devices through the Internet, remotely invoking real-time events within the device. After Web-enabling, running a Rhapsody™ model, and connecting to the device in a Web browser, controllers can view and control a device through the Rhapsody™ Web GUI, using aggregate tables.

Aggregate tables contain name-value pairs of Rhapsody™ Web-enabled elements that are visible and controllable through Internet access to the machine hosting the Rhapsody™ model. Navigate to aggregate tables in the Rhapsody™ Web GUI by browsing to classes selected on the Objects Navigation page.

FIG. 15 shows an example of the name-value pairs as they appear in an aggregate table. The table of FIG. 15 shows the name of each element within the aggregates, and whether the values are readable or writable.

You can monitor a device by reading the values in the dynamically populated text boxes and combo-boxes. When a string value extends beyond the width of the text field, position the mouse arrow over the text field to display a tooltip, as shown for the sendstring element.

You can control a device in real-time by pressing the Activate button, which initializes an event, or by editing writable text fields (the text boxes that do not have a gray background). Note that an input box displays a red border while being edited, indicating that its value will not refresh until you exit the field.

The Web GUI uses different fields and folders to indicate types of values and their read and write permissions. The following table lists the way name-value pairs are displayed.

| Name-Value | Read/Write Indication |
| --- | --- |
| Numeric values | Readable values dynamically populate the text box.<br>Write-protected values display in a text box with a gray background; otherwise, the value is writable.<br>To send a changed value, type the value in the text box and either press Enter or exit the box by clicking outside of it. |
| String values | Readable values dynamically populate the text box.<br>Write-protected values display in a text box with a gray background,; otherwise, the value is writable.<br>To send a changed value, type the value in the text box and either press Enter or exit the box by clicking outside of it. |
| Boolean variable | Writable values display in a combo-box containing True and False values. |
| Activation buttons | Clicking these buttons initializes the corresponding event in the model. |
| Tan folders | Denote child aggregates; clicking a folder displays the selected aggregate within. |

| Name-Value | Read/Write Indication |
| --- | --- |
| Blue folders | Denote user-created views nested within aggregates; clicking a folder displays the selected contents within. |

Customizing the Web Interface

You can customize the Web interface for a model by creating your own pages to add to their Rhapsody™ Web GUI, or by referencing the collection of on-the-fly pages that come with Rhapsody™. In addition, you can configure the Rhapsody™ Web server, giving it custom settings appropriate for your management of a Web-enabled device.

Adding Web Files to a Rhapsody™ Model

You can add your own HTML, image, multimedia or script files to the Rhapsody™ Web server file system from within the Rhapsody™ application.

Figure 16:
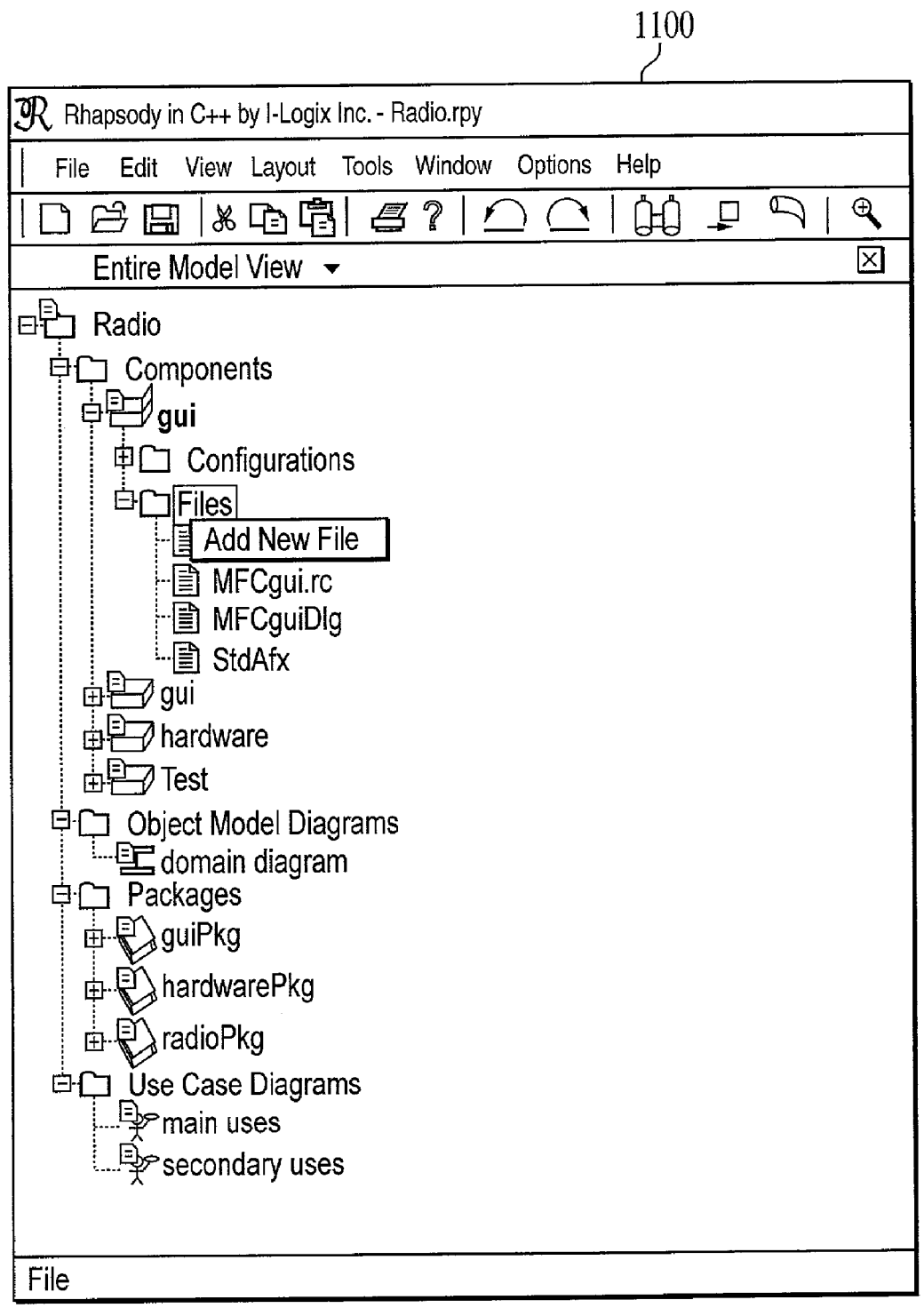
FIG. 16 is an example user interface according to the embodiment of FIG. 11, for use in adding files to a component in the browser
Figure 17:
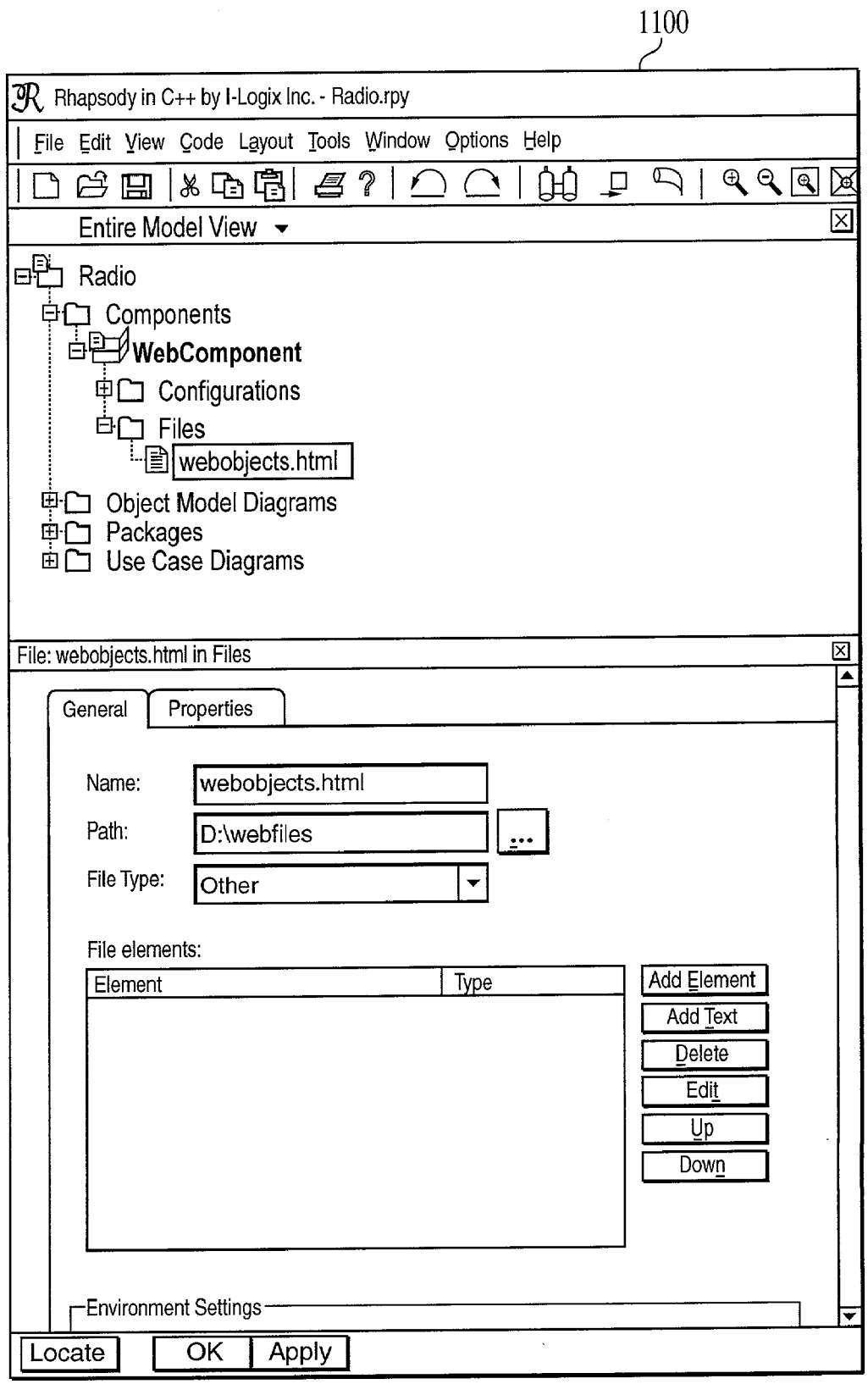
FIG. 17 is an example user interface according to the embodiment of FIG. 11, for use in adding files to a web-enabled model.

To upload the files to the Web server, do the following:
1. In the browser of a working Rhapsody™ model, navigate to Components><Component Name>>Files.
2. Right-click the Files root directory. Select Add New>File.
   The new file settings are displayed in the right pane, shown in FIG. 16.
3. Right-click the file and select Properties from the pop-up menu. Select WebComponents as the subject and set the value of the WebManaged property within the File metaclasses to True.
4. Use the features dialog box, shown in FIG. 17, for files to set up the file. Set the following fields:
   Name—Type in the name of your HTML file.
   Path—Type in, or browse to, the file you want to upload to the Web server.
   File Type—Set to Other.

Click OK to apply your changes and dismiss the dialog box. The file name appears with the collection under Files in the browser.

5. Generate the code. Code generation converts the file to a binary format, and embeds it into the executable file generated by Rhapsody™.

You can view Web files you have added to your model by going to the following URL:

http://<ip_address>/<filename>

Accessing Web Services Provided with Rhapsody™

Rhapsody™ comes with a collection of generated on-the-fly Web pages for you to add to your Web interface to help in the development process. At run time, these pages provide useful functionality in the development process; however, easy access to them in deployment of devices is not appropriate or recommended.

The following sections describe how to use, access, and link to each of these pages.

The Upload a File to Server Page

You can upload your own HTML, image, multimedia or script files to the Rhapsody™ Web server through the Internet from the Upload a File to Server page. To navigate directly to the page, use the following URL:

http://<ip_address>/cgibin?Abs_App=Abstract_Upload

Figure 18:
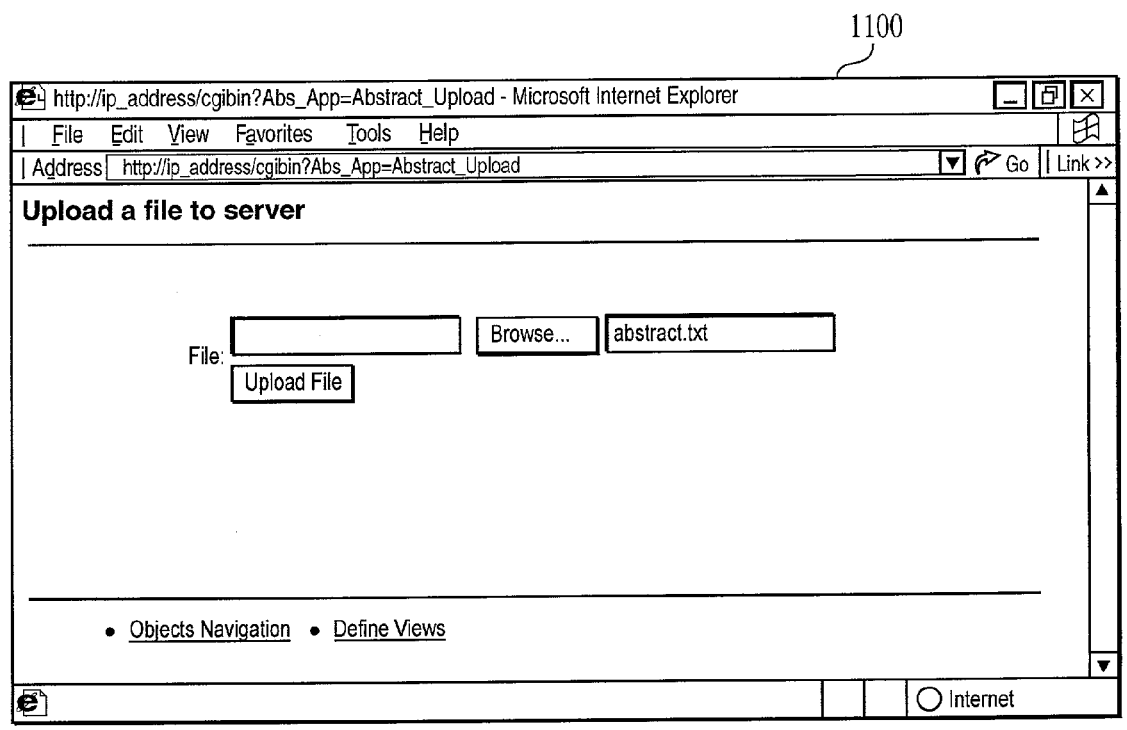
FIG. 18 is an example user interface according to the embodiment of FIG. 11, for use in uploading a file to a server page on the web-enabled model.

To add this page into your Personal Navigation page, its open anchor tag should read as follows:

```
<a href="cgibin?Abs_App=Abstract_Upload">
```
FIG. 18 shows the Upload a File to Server page.

To upload a new file—or overwrite a file—to the Rhapsody™ Web server using this page, do the following:
1. Type in the path, or browse, to the file.
2. Click Upload.

Note: This page should only be used by developers who understand the impact of their uploads. The collection of on-the-fly services provided with the Rhapsody™ Web server are intended to assist as a development tool; easy access to them in deployment of devices is not appropriate or recommended.

For an example of the server settings for using this page, see <Rhapsody>/Share/MakeTmpl/web/WebServerConfig/AddUploadFunctionality.

The Statistics Page

Figure 19:
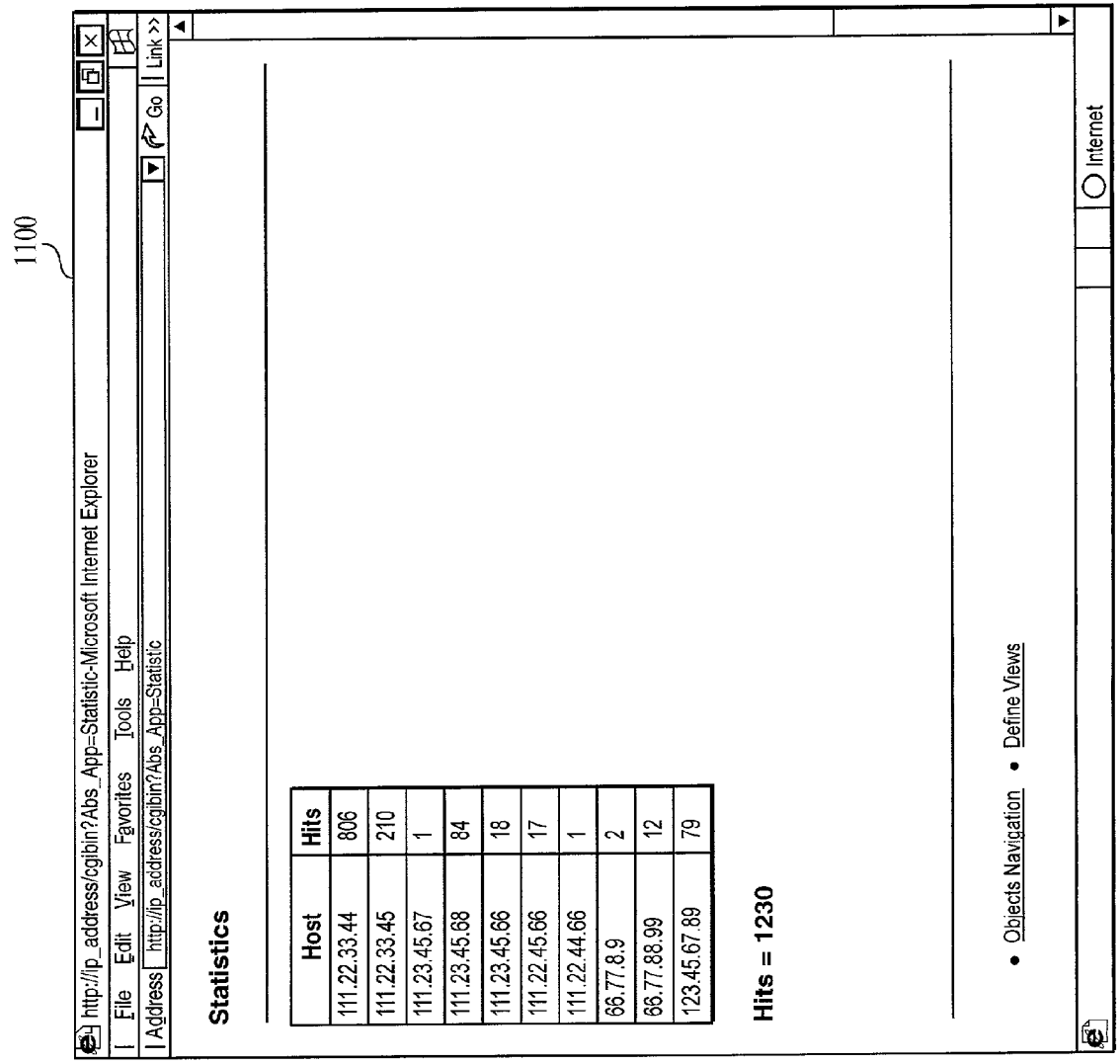
FIG. 19 is an example user interface according to the embodiment of FIG. 11, for use in tabulating statistics from a device accessing the model.

The Statistics page, shown in FIG. 19, tabulates page and file requests, or "hits", from each machine accessing the model.

You can navigate directly to the page by going to the following URL:
```
http://<ip_address>/cgibin?Abs_App=Statistic
```
To add this page into your Personal Navigation page, its open anchor tag should read as follows:
```
<a href="cgibin?Abs_App=Statistic">
```

The List of Files Page

Figure 20:
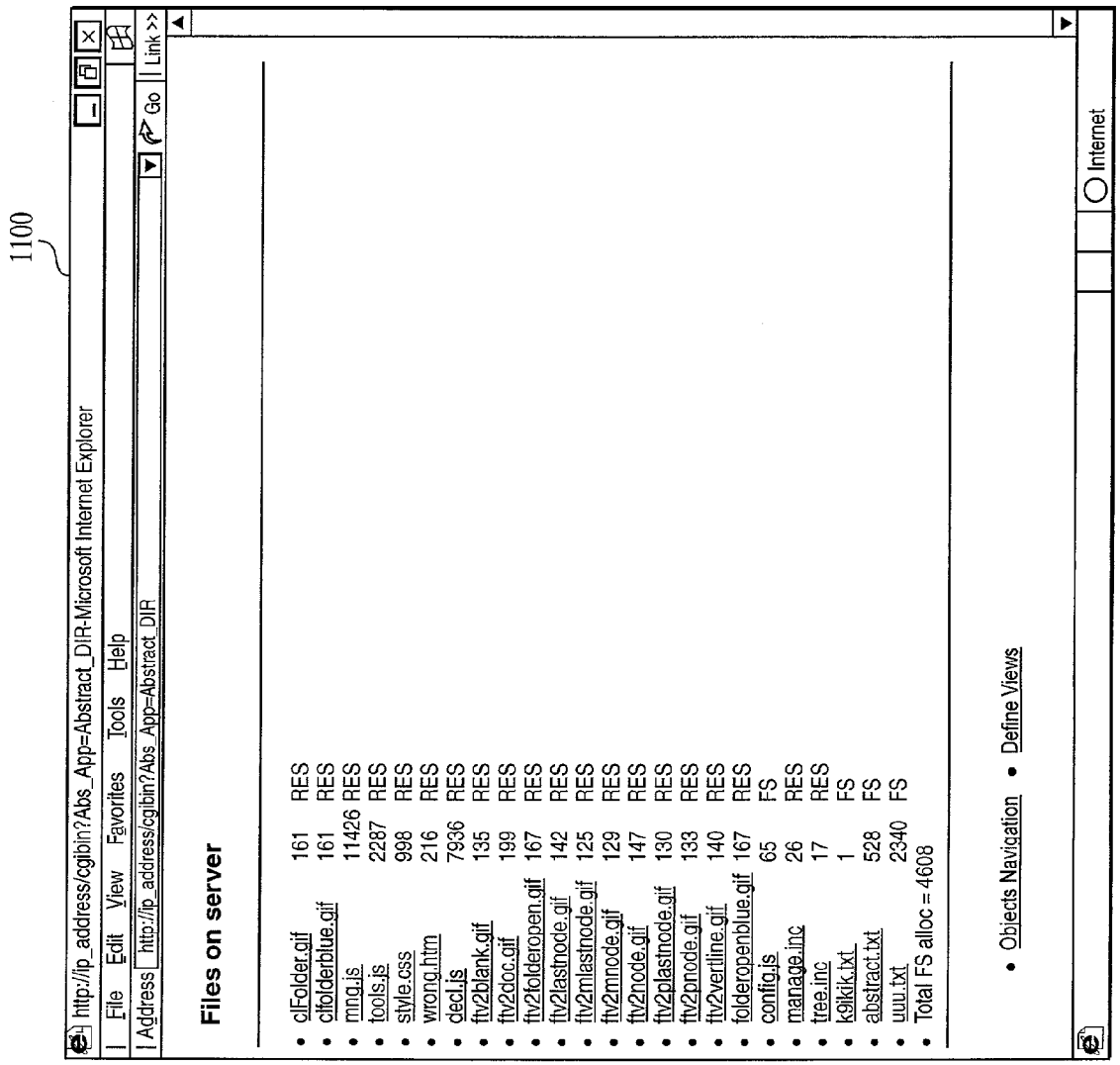
FIG. 20 is an example user interface according to the embodiment of FIG. 11, for use in listing the files provided with a default web GUI that generates automatically for the web-enabled model.

This List of Files page, shown in FIG. 20, lists all the text and graphic files that come with the default Web GUI that generates automatically when running a Web-enabled Rhapsody™ model.

You can navigate directly to the page by going to the following URL:
```
http://<ip_address>/cgibin?Abs_App=Abstract_DIR
```
To add this page into your Personal Navigation page, its open anchor tag should read as follows:
```
<a href="cgibin?Abs_App=Abstract_DIR">s
```
The list includes the size, in bytes, and type of each file, and displays the total size of all included Web GUI files.

Files labeled as "RES" denote code segments; files labeled "FS" denote those stored in the file system.

For an example of using this page, see <Rhapsody>/Share/MakeTmpl/web/SettingSignatureExample.

To use the signEnhanced.htm navigation page, rename the page sign.htm.

Adding Rhapsody™ Functionality to Your Web Design

You can completely change the layout and design of the Web interface to your Rhapsody™ model and still have all the functionality provided, by default, when running a Web-enabled Rhapsody™ model. You can create an interface that refreshes changed element values in real time, and provide the same interactive capabilities to remotely control and monitor a device.

Calling Element Values

After designing a static version of your HTML page, using placeholders for element values, you can overwrite each placeholder text with script that will call the values of each element dynamically from your uploaded page.

To make dynamic element values from a Web-enabled Rhapsody™ model appear in your Web page, do the following:
1. If you want to design the layout of your page first, design your Web page, leaving static text as a placeholder for a dynamic value.
2. Edit your HTML file, including the manage.inc file in the header of the HTML file in script tags before the </head> tag:

```
<head>
    <title> Your Title Here</title>
    <script src='manage.inc'></script>
</head>
```

The manage.inc file includes a collection of JavaScript files that control client-side behavior of the Rhapsody™ Web interface.
3. Edit your HTML file, substituting function-calling script for each static value placeholder.
   For example:
   ```
   <body>value of evStart</body>
   ```
   This becomes:
   ```
   <body><script>show('nameOfElement')</script></body>
   ```
   In this sample code, nameOfElement is the element name assigned to the element by Rhapsody™, visible in the default Web interface. Be sure to use the full path name of the element in the show function, as in the following example:
   ```
   show('ProcessController[0]:: OMBoolean_attribute');
   ```
4. Save the file and upload it to the Rhapsody™ Web server (see "Adding Web Files to a Rhapsody™ Model").

You can link to this file in your Web interface from your new design scheme. If you want to make a page the front page of your Web GUI, see "Setting a Home Page". Keep in mind that Rhapsody™ does not yet support a hierarchical file structure, so HTML and image files are at the Web server's root directory.

Binding Embedded Objects to Your Model

Using this design method, you embed graphical elements in your Web page as JavaScript objects, then bind those objects to the Rhapsody™ model's real-time values. By binding embedded graphics and mapping them to the values of Web-enabled elements, you can create a page where an image is displayed in the Web interface when a process has stopped (for example, a stop sign), whereas another indicates that the process is running (such as a green light).

One approach to making such pages is to design a page with all your static elements, then add script to your HTML. Do the following:
1. Edit your HTML file, including the manage.inc file in the header of the HTML file in script tags before the </head>tag:

```
<head>
    <title> Your Title Here</title>
    <script src='manage.inc'></script>
</head>
```

The manage.inc file includes a collection of JavaScript files that control client-side behavior of the Rhapsody™ Web interface.
2. To embed model elements in the page, create JavaScript objects of the WebObject type and bind each object with the elements of the device you are managing and controlling through the Internet, using the bind function.

The following sample code displays a yellow lamp when a Boolean element's value is true, and a red lamp when the value is false:

```
<html><head><title>Page Title</title>
<script src='manage.inc'></script>
<script>
function updateMyLamp(val)
{
    if (val == 'On')
    {
        document.all.myImage.src = 'redLamp.gif';
    }
    else
    {
        document.all.myImage.src = 'yellowLamp.gif';
    }
}
var lamp = new WebObject;
bind(window.lamp,
    'ProcessController[0]::OMBoolean_attribute');
lamp.update = updateMyLamp;
</script>
</head>
<body>
<img id=myImage border=0>
<hr noshade>
<i>Rotate the bool values here<i>
<script>show('ProcessController[0]::rotate');</script>
</body>
</html>
```

The declaration of the object and binding takes place in the header of the document, between the second pair of script tags.

The bind function serves as a bridge between the element values in the model and the Web interface. It takes two arguments—the variable name of the JavaScript object (lamp in the example) and the name of the model element in Rhapsody™ (ProcessController[0]::rotate in the example).

In the example, the following line refreshes updated model values in the Web GUI:

lamp.update=updateMyLamp;

This update function accepts one argument, which is the new value of the element.

If a GUI control in the page needs to pass information to the device, call the set method of the corresponding object. The set method accepts one argument, the newly set value.

Customizing the Rhapsody™ Web Server

To customize the Rhapsody™ Web server, you modify the webconfig.c file and add that file to your Web-enabled Rhapsody™ model. The webconfig.c file is located within your Rhapsody™ directory at Share/MakeTmpl/Web. The file is clearly commented before each function. To change the Web server settings, edit the argument of the function to the appropriate setting.

Because other models will use this file to configure Web server settings, copy the file to another directory within your Web-enabled project, for example, and edit that copy of the webconfig.c file. In the process of customizing your Web server, be sure to add it to the configuration of your active component from within the Rhapsody™ interface.

To add the modified webconfig.c file to your Web-enabled model, do the following:

1. In the browser of a working Rhapsody™ model, navigate to Components ><Component Name>>Configurations. Select the active configuration.
2. In the features dialog box, click the Settings tab.
3. In the Additional Sources text box, type the location of the modified webconfig.c file.

The kit includes examples in the <Rhapsody>\Share\MakeTmpl\web\WebServer directory.

Setting a Device Name

To change the name of a device, modify the argument to the SetDeviceName method.

For example, to change the setting of the device name to "Excellent Device", modify the call as follows:

SetDeviceName("Excellent Device");

See <Rhapsody>\Share\MakeTmpl\web\WebServer\Change DeviceName for an example.

Setting a Home Page

To change the setting of the home page to index.htm, the function and argument should read as follows:

SetHomePageUrl("index.htm");

Setting a Personalized Bottom Navigation

There are two ways to personalize the bottom navigation page:

Overwrite the sign.htm file with your changed design and upload it to the Rhapsody™ Web server (see "The Personalized Navigation Page").

Use a function in the webconfig.c files to use another file for personalized bottom navigation. For example, to change the page name of the bottom navigation page to navigation.htm, the function and argument should read as follows:

SetSignaturePageUrl("navigation.htm");

Setting a Port Number

By default, the Rhapsody™ Web server listens on port 80. To change the port number, change the argument to the SetPropPortNumber method.

For example, to change the port number to "8000", use the following call:

SetPropPortNumber(8000);

Setting an Automatic Refresh Rate

To change how frequently the Rhapsody™ Web server refreshes changed values, use the SetRefreshTimeout function. The argument to this function holds the refresh rate, in milliseconds.

For example, to change the refresh interval to every 5 seconds, use the following call:

SetRefreshTimeout(5000);

See <Rhapsody>\Share\MakeTmpl\web\WebServer\Change RefreshRate for an example.

In these and other embodiments of the present invention, the interface and web browser and any related data storage may reside on the same server or computer, or may be distributed and run on one or more separate servers and/or other computers. The functions of the interface and web browser may optionally be distributed among separate servers, programmed devices and/or computer systems.

Some users might prefer to utilize FTP for communication of data. Alternatively, the data representing the device information may be transferred using any appropriate communication protocol, e.g., modem over POTS.

Figure 21:
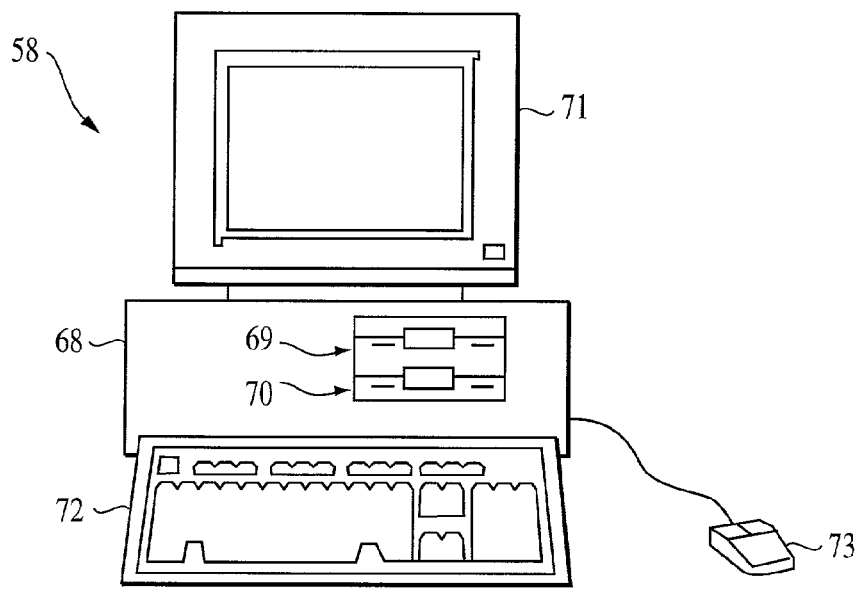
FIG. 21 shows a block diagram of a computer used for implementing the remote interface of a web-enabled device in accordance with a computer implemented embodiment of the present invention.

FIG. 21 is an illustration of a computer 58 used for implementing the computer processing in accordance with a computer-implemented embodiment of the present invention. The procedures described above may be presented in terms of program procedures executed on, for example, a computer or network of computers.

Viewed externally in FIG. 21, computer 48 has a central processing unit (CPU) 68 having disk drives 69, 70. Disk drives 69, 70 are merely symbolic of a number of disk drives that might be accommodated by computer 58. Typically, these might be one or more of the following: a floppy disk drive 69, a hard disk drive (not shown), and a CD ROM or digital video disk, as indicated by the slot at 70. The number and type of drives varies, typically with different computer configurations. Disk drives 69, 70 are, in fact, options, and for space considerations, may be omitted from the computer system used in conjunction with the processes described herein.

Computer 58 also has a display 71 upon which information may be displayed. The display is optional for the computer used in conjunction with the system described herein. A keyboard 72 and/or a pointing device 73, such as a mouse 73, may be provided as input devices to interface with central processing unit 68. To increase input efficiency, keyboard 72 may be supplemented or replaced with a scanner, card reader, or other data input device. The pointing device 73 may be a mouse, touch pad control device, track ball device, or any other type of pointing device.

Figure 23:
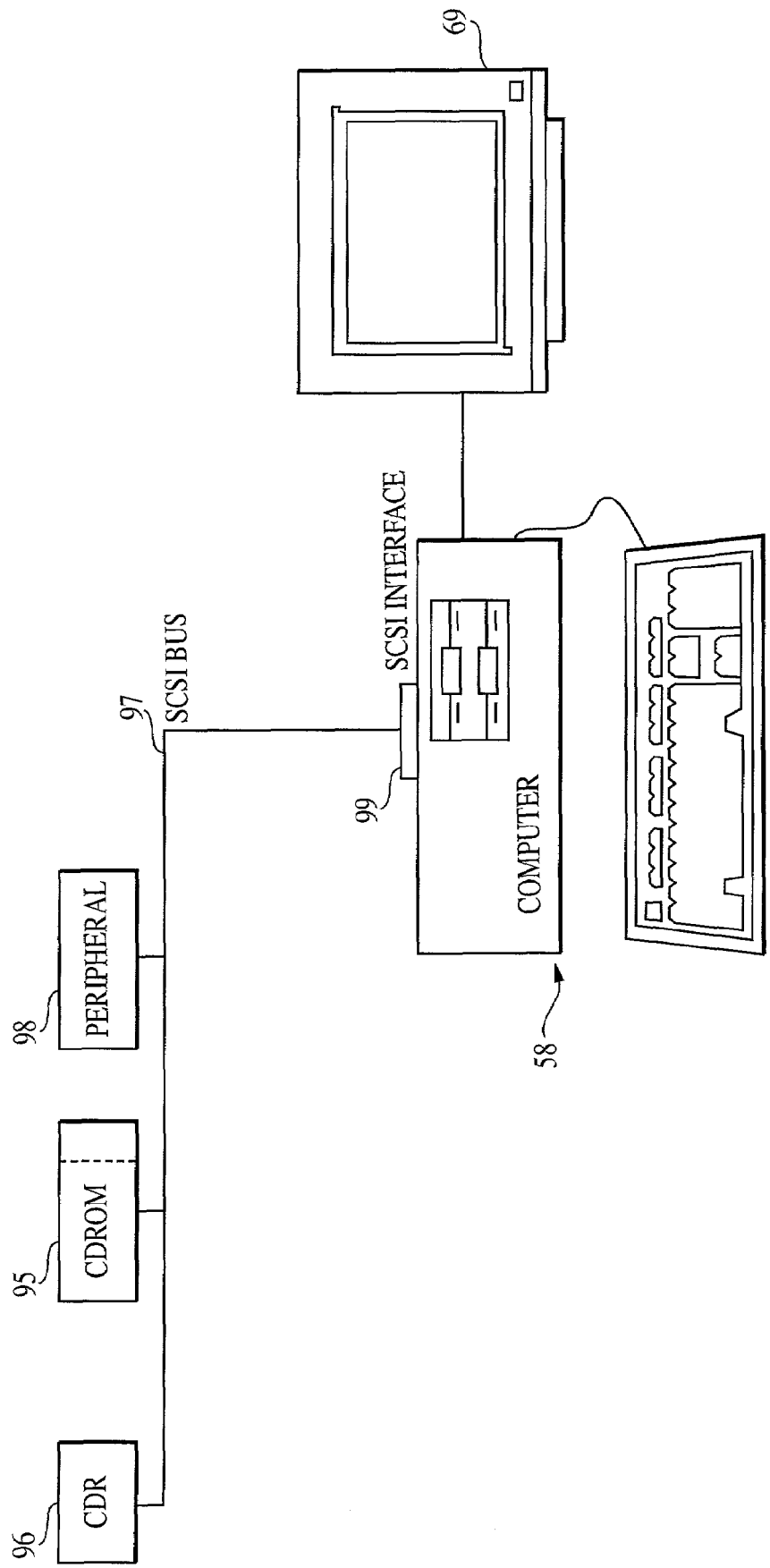
FIG. 23 illustrates a block diagram of an alternative computer of a type suitable for carrying out the present invention.

Alternatively, referring to FIG. 23, computer 58 may also include a CD ROM reader 95 and CD recorder 96, which are interconnected by a bus 97 along with other peripheral devices 98 supported by the bus structure and protocol. Bus 97 serves as the main information highway interconnecting other components of the computer. It is connected via an interface 99 to the computer 58.

Figure 22:
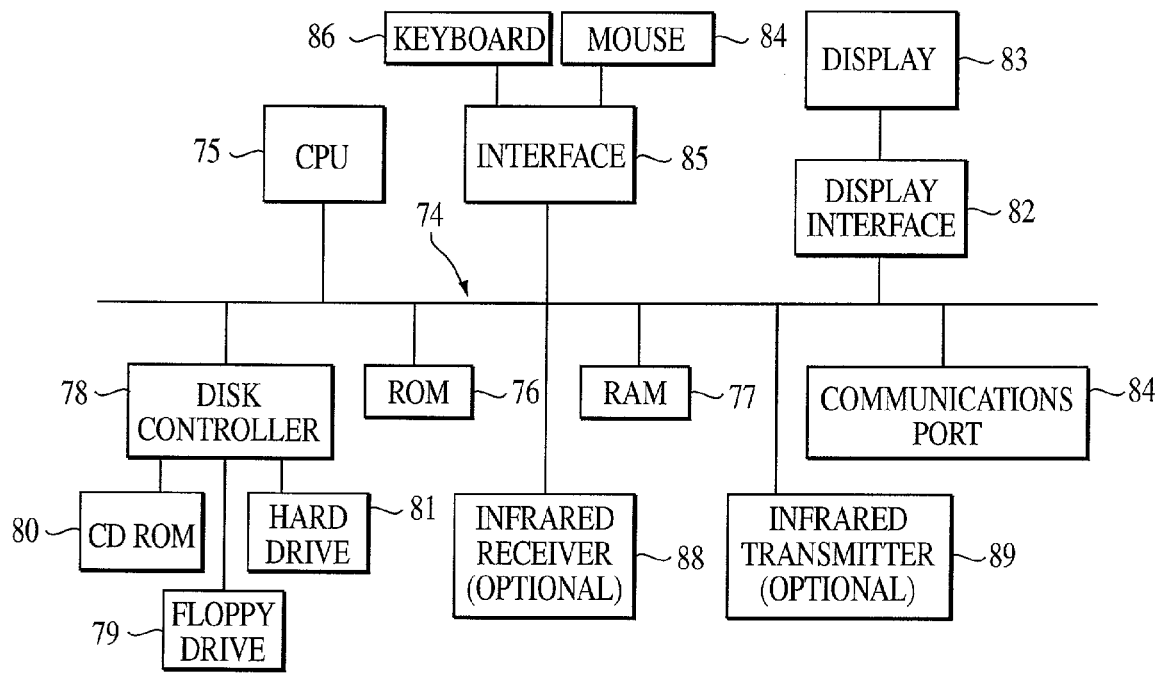
FIG. 22 illustrates a block diagram of the internal hardware of the computer of FIG. 21.

FIG. 22 illustrates a block diagram of the internal hardware of the computer of FIG. X1. CPU 75 is the central processing unit of the system, performing calculations and logic operations required to execute a program. Read only memory (ROM) 76 and random access memory (RAM) 77 constitute the main memory of the computer.

Disk controller 78 interfaces one or more disk drives to the system bus 74. These disk drives may be floppy disk drives such as 79, or CD ROM or DVD (digital video/versatile disk) drives, as at 80, or internal or external hard drives 81. As previously indicated these various disk drives and disk controllers are optional devices.

A display interface 82 permits information from bus 74 to be displayed on the display 83. Again, as indicated, the display 83 is an optional accessory for a central or remote computer in the communication network, as are infrared receiver 88 and transmitter 89. Communication with external devices occurs using communications port 84.

In addition to the standard components of the computer, the computer may also include an interface 85, which allows for data input through the keyboard 86 or pointing device, such as a mouse 87.

Conventional processing system architecture is more fully discussed in *Computer Organization and Architecture*, by William Stallings, MacMillan Publishing Co. (3d ed. 1993). Conventional processing system network design is more fully discussed in *Data Network Design*, by Darren L. Spohn, McGraw-Hill, Inc. (1993). Conventional data communications is more fully discussed in *Data Communications Principles*, by R. D. Gitlin, J. F. Hayes, and S. B. Weinstain, Plenum Press (1992), and in *The Irwin Handbook of Telecommunications*, by James Harry Green, Irwin Professional Publishing (2d ed. 1992). Each of the foregoing publications is incorporated herein by reference.

The foregoing detailed description includes many specific details. The inclusion of such detail is for the purpose of illustration only and should not be understood to limit the invention. In addition, features in one embodiment may be combined with features in other embodiments of the invention. Various changes may be made without departing from the scope of the invention as defined in the following claims.

As one example, the user's computer may include a personal computer, a general purpose computer, or a specially programmed special purpose computer. Likewise, the device application may execute on an embedded system, or even a general purpose computer or specially programmed dedicated computer closely connected to and/or controlling the device. Either of these may be implemented as a distributed computer system rather than a single computer. Similarly, the communications network that is illustrated as the Internet may be an Intranet, the World Wide Web, a modem over a POTS line, and any other method of communicating between computers and/or devices. Moreover, the processing could be controlled by a software program on one or more computer systems or processors, or could even be partially or wholly implemented in hardware, or could be partly embedded within various devices.

This invention is not limited to particular types of devices with embedded systems. It is intended for use with any type of devices that may communicate remotely. Further, the device's intelligence might not be physically embedded, but could be closely coupled with the device.

Further, the invention is not limited to particular protocols for communication. Any appropriate communication protocol may be used with the meter devices.

The user displays may be developed in connection with HTML display format. Although HTML is the preferred display format, it is possible to utilize alternative display formats for displaying reports and obtaining user instructions. The invention has been discussed in connection with particular examples. However, the principals apply equally to other examples. Naturally, the relevant data may differ, as appropriate.

Further, this invention has been discussed in certain examples as if it is made available by a provider to a single customer with a single site. The invention may be used by numerous customers, if preferred. Also, the invention may be utilized by customers with multiple sites and/or users.

The system used in connection with the invention may rely on the integration of various components including, as appropriate and/or if desired, hardware and software servers, applications software, database engines, firewalls, security, production back-up systems, and/or applications interface software. The configuration may be, preferably, network-based and optionally utilizes the Internet as an exemplary primary interface with the customer for information delivery.

From the user's perspective, according to some embodiments the user may access the public Internet or other suitable network and look at its specific information at any time from any location as long as the user has Internet or other suitable access. For example, the user may open a standard web browser, goes to the address that is specified for its device, and optionally fills out a user ID to log on, and a password to identify it as the specific user or the specific customer allowed access to that device.

The embedded system may include a file system. As one option, it may include a mechanism simulating a file system inside the application that does not rely on the existence of one, for cases where I/O and storage devices are not available for the embedded application. As another option, it may include a packaging of web resource files, such as pictures and HTML files (used for the customized user-interface) on the embedded application.

Figure 24:
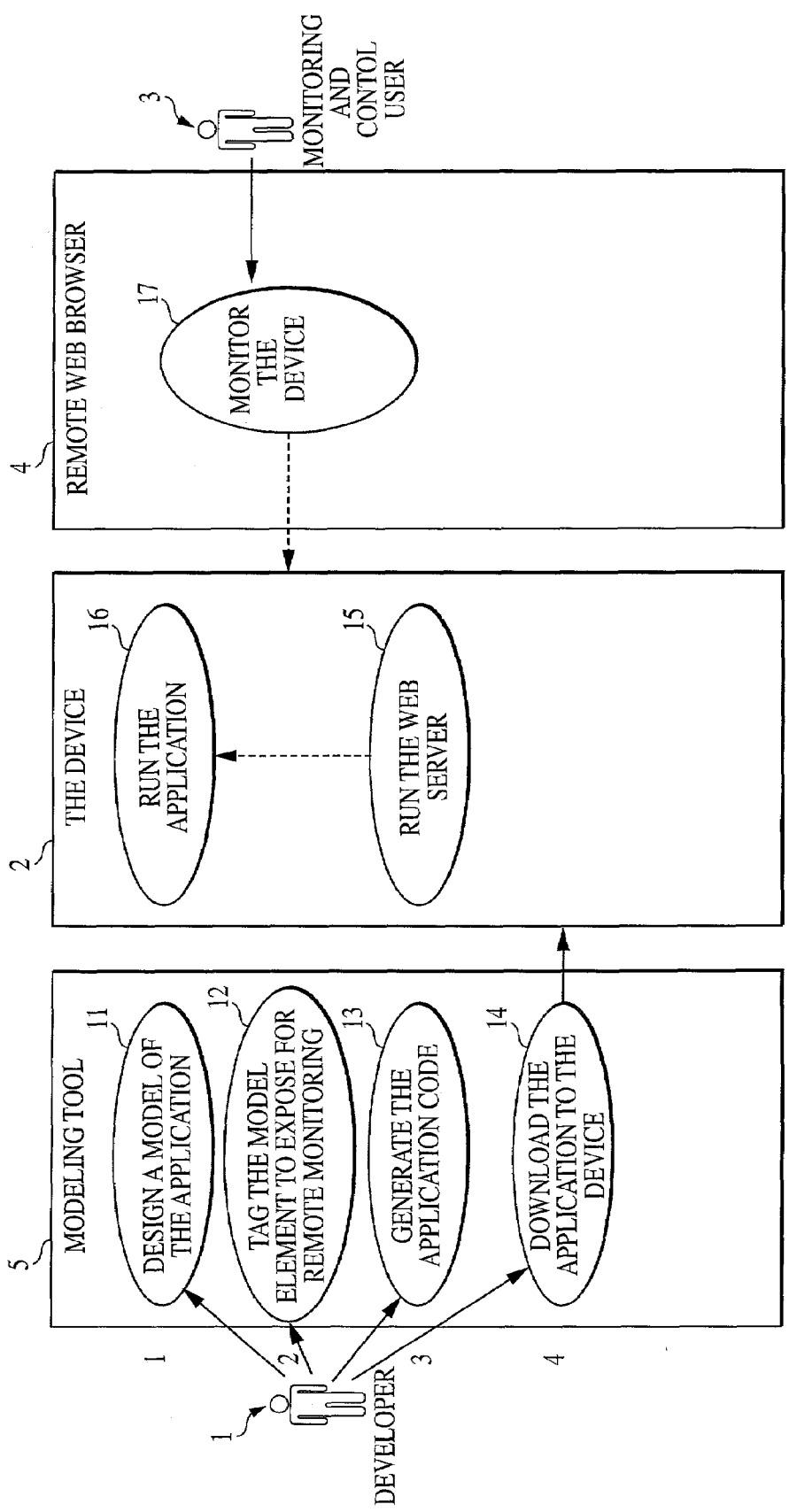
FIG. 24 is a block diagram illustrating one or more embodiments of the present invention in relation to a developer-type user, and a monitoring and control-type user.

Reference is made to FIG. 24, illustrating one example of a way in which the software may be developed and run. Here, the developer 1, utilizing the modeling tool 5, designs a model of the application at block 11. Then, he tags the model element(s) to be exposed for remote monitoring, at block 12. The application code is generated, block 13, and the application is downloaded to the device 2, block 14. The end user, such as user 3 who wishes to perform monitoring and control of the device 3, utilizes a standard remote web browser 5, in order to monitor the device, block 17. The device runs the application, block 16, and responsive to the user 3, runs the web server, block 15.

The term "user" herein may indicate an individual user using the system on behalf of himself; or an individual using the system on behalf of another person, corporation or other entity. "User" may include without limitation a developer, customer, end user, etc. "User" should be read as broadly as is appropriate for the context.

What is claimed is:

1. A computer implemented method for allowing a user to control and/or monitor a device of various types, where the user and a user interface are located remotely form the device, in a real-time manner, comprising:
    identifying a plurality of elements of the device;
    indicating at least one of the elements to be manageable over a network;
    in response to the indicating step, identifying a model of the device, tagging an object in the model corresponding to the indicated element, and running the model to generate an application to be provided to the device, wherein said generating the application includes generating remote management code corresponding to the indicated elements;
    providing the device with the application for running the application on the device; and
    responsive to initiation of the user interface, associating the indicated element corresponding to the application provided to the device to the user interface, and establishing communication between the user interface and the device.

2. The method of claim 1, further comprising, while the device is in communication with the user interface, responsive to a user request, communicating from the user interface to the application running on the device to obtain current information regarding the device.

3. The method of claim 1, further comprising, while the device is in communication with the user interface, responsive to a user request, transmitting a control command from the user interface to the remote device application, and executing the control command at the remote device.

4. The method of claim 1, further comprising, while the device is in communication with the user interface, receiving from the remote device application, information sent to the user interface.

5. The method of claim 4, wherein the information received from the remote device application is responsive to a request from the user interface, or is responsive to a change in information at the device.

6. The method of claim 1, wherein the indicating is performed utilizing a graphical tag.

7. The method of claim 1, wherein the indicating is performed utilizing UML stereotypes, and wherein the application is modeled with a UML model.

8. The method of claim 1, wherein the indicated at least one element is tagged with a predefined stereotype.

9. The method of claim 1, wherein the device includes an embedded processor running the application, or a host running the application that controls the device.

10. The method of claim 1, wherein the network is at least one of the Internet, an Intranet, a local area network, and a wide area network.

11. The method of claim 1, wherein the user interface functions in connection with a pre-existing browser.

12. The method of claim 1, wherein a visual modeling tool provides the indicating.

13. The method of claim 1, further comprising extracting at least a portion of the information from the model of the device, and creating the remote management code, to be used in connection with the application, that enables the at least one element to be visible and/or controllable from the network.

14. The method of claim 13, including a step of deducing the topology of the elements, for use in creating a natural looking hierarchy of objects in the application, which are to be presented on the user interface.

15. The method of claim 1, wherein the user interface includes at least one user control, and including determining which of the at least one user controls to associate with the at least one element, whereby a user interface that is suitable for the application is defined.

16. The method of claim 1, further comprising providing, on the user interface, responsive to a user request, navigating and/or inspecting a plurality of objects in the application and a state thereof.

17. The method of claim 16, wherein the navigating and/or inspecting includes an expandable and collapsible graphical user interface.

18. The method of claim 1, further comprising customizing the user interface by associating, at a computer on which the user interface runs, responsive to a web page of a user interface on the computer being rendered, at least one control and/or monitor in the web page to the at least one element of the application on the device.

19. The method of claim 18, wherein the at least one control is one of an operation or an event, and the at least one monitor is one of a state, data or value, corresponding to the device.

20. The method of claim 18, further comprising revising a content and/or a layout and/or an association of the web page.

21. The method of claim 1, wherein the remote management code includes a web server and one or more web pages corresponding to the indicated element that can be accessed by the web server.

22. A computer implemented method for allowing a device of various types to be controlled and/or monitored by a user, where the user and a user interface are located remotely form the device, in a real-time manner, comprising:
    identifying a model of the device, the device having at least one indicated element among a plurality of elements of the device, the at least one element of the device being manageable over a network;
    tagging an object in the model corresponding to the indicated element;
    running the model to generate an application to be provided to the device, wherein said generating the application includes generating remote management code corresponding to the indicated elements;
    providing the device with the application for running the application on the device; and
    allowing communication between the device and a user interface, and allowing the at least one indicated element of the device corresponding to the application that was provided to the device to be managed.

23. The method of claim 22, further comprising, while the device is in communication with the user interface, responsive to a request for current information, transmitting from the application, to the user interface, current information regarding the device.

24. The method of claim 22, further comprising, while the device is in communication with the user interface, responsive to a control command, executing the control command at the device.

25. The method of claim 22, further comprising, while the device is in communication with the user interface, transmitting from the application, current information regarding the device.

26. The method of claim 25, wherein the information transmitted from the application is responsive to a request from the user interface, or is responsive to a change in information at the device.

27. The method of claim 22, wherein the device includes an embedded processor running the application, or a host running the application that controls the device.

28. The method of claim 22, wherein the network is at least one of the Internet, an Intranet, a local area network, and a wide area network.

29. The method of claim 22, wherein the user interface functions in connection with a pre-existing browser.

30. The method of claim 22, wherein the application includes the topology of the elements.

31. The method of claim 22, further comprising providing the real-time behavior of the application for use in presentation on the user interface, including reducing the load on the CPU and memory resource of the device, by transferring at least a portion of the load to the browser.

32. The method of claim 22, further comprising, responsive to a request from the user, inspecting the application and at least one of a plurality of objects in the application and inspecting a state thereof.

33. The method of claim 22, wherein the device has no peripheral storage device, further comprising a file system in the application, simulating at least one input/output device and/or storage device.

34. The method of claim 22, further comprising storing at least a portion of the user interface in the device.

35. The method of claim 34, wherein the portion of the user interface stored in the device is selected from web resource files, pictures, and HTML files.

36. The method of claim 34, wherein the user interface has been customized.

37. The method of claim 22, wherein the remote management element code includes a web server and one or more web pages corresponding to the indicated element that can be accessed by the web server.

* * * * *